United States Patent Office 3,510,492
Patented May 5, 1970

3,510,492
2-ANILINO AND 2-ANILINOMETHYL CYCLOALKYLAMINES
Jacob Szmuszkovicz, Kalamazoo, Mich., assignor to The Upjohn Company, Kalamazoo, Mich., a corporation of Delaware
No Drawing. Filed May 13, 1968, Ser. No. 728,796
Int. Cl. C07d *29/28;* C07c *87/50*
U.S. Cl. 260—293        16 Claims

ABSTRACT OF THE DISCLOSURE

Compounds of the formula

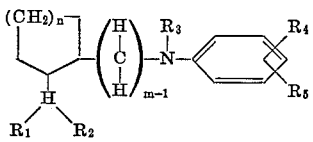

wherein $n$ is 1 to 4, inclusive; wherein $m$ is 1 or 2; wherein $R_1$ and $R_2$ are selected from the group consisting of hydrogen, lower-alkyl and benzyl or wherein the group

is

in which

represents a heterocyclic amino radical containing from 5 to 9 nuclear atoms, inclusive; wherein $R_3$ is selected from the group consisting of hydrogen, lower-alkyl and benzyl; and wherein $R_4$ and $R_5$ are selected from the group consisting of hydrogen, lower-alkyl, lower-alkoxy, hydroxy, halogen and —$CF_3$, with the proviso that when $m$ is 1 and

is other than

at least one of $R_4$ and $R_5$ is selected from the group consisting of hydroxy, lower-alkoxy, halogen and —$CF_3$. The compounds and their pharmacologically acceptable acid addition salts are useful as oral antidiabetic agents and frequently have mild diuretic action.

BACKGROUND OF THE INVENTION

This invention relates to new organic compounds and is more particularly concerned with cis and trans 1,2-disubstituted cycloalkanes of the formula:

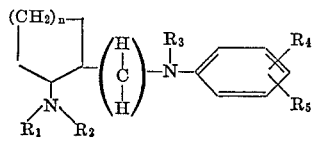

wherein $n$ is 1 to 4, inclusive; wherein $m$ is 1 or 2; wherein $R_1$ and $R_2$ are selected from the group consisting of hydrogen, alkyl having from 1 to 4 carbon atoms, inclusive, and benzyl or wherein the group

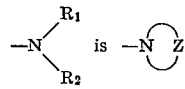

in which

represents a heterocyclic amino radical containing from 5 to 9 nuclear atoms, inclusive; wherein $R_3$ is selected from the group consisting of hydrogen, alkyl as defined above, and benzyl; and wherein $R_4$ and $R_5$ are selected from the group consisting of hydrogen, alkyl and alkoxy having from 1 to 4 carbon atoms, inclusive, hydroxy, halogen and —$CF_3$, with the proviso that when $m$ is 1 and

is other than

at least one of $R_4$ and $R_5$ is selected from the group consisting of hydroxy, alkoxy as defined above, halogen and —$CF_3$. Furthermore, the invention comprises the acid addition salts of the compounds of Formula I, particularly the pharmacologically acceptable acid addition salts, the methods of preparation of the compounds of Formula I, and the novel intermediates.

SUMMARY OF THE INVENTION

The novel compounds, intermediates and methods of preparation can be illustratively represented as follows:
Method A to make compounds Ia (i.e., compound I wherein $m=1$; $R_3=$hydrogen; $R_1$ and $R_2$ are alkyl, benzyl, or

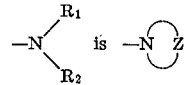

as defined above; in trans-isomer form) and Ib (compound I wherein $m=1$; $R_3=$lower-alkyl; in trans-isomer form):

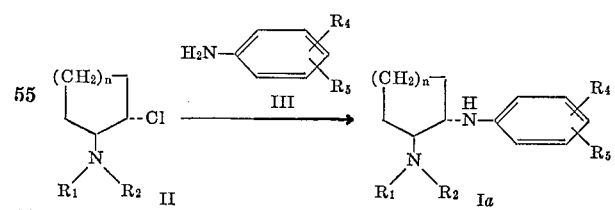

$R_0$ is hydrogen or alkyl having from 1 to 3 carbon atoms, inclusive.

Method B (alternate) for the compound of Formula Ia:

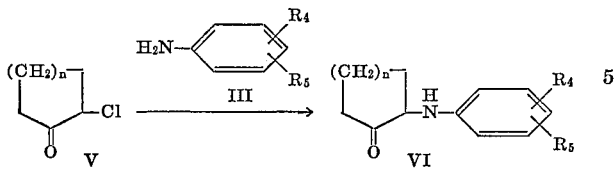

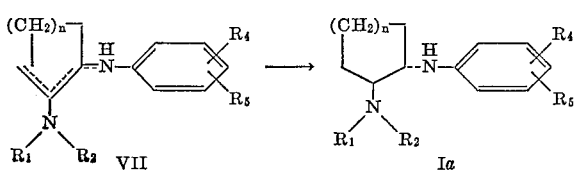

Method B, in addition to its usefulness in preparing Formula Ia tertiary amines, can also be used to prepare the primary and secondary amines (in trans configuration) of Formula I wherein $m$ is 1, merely by using ammonia or a primary amine for enaminization (VI to VII) instead of a secondary amine.

Method C for the compounds of Formulae Ic and Ic' (compound I wherein $m=1$, in cis-isomer form):

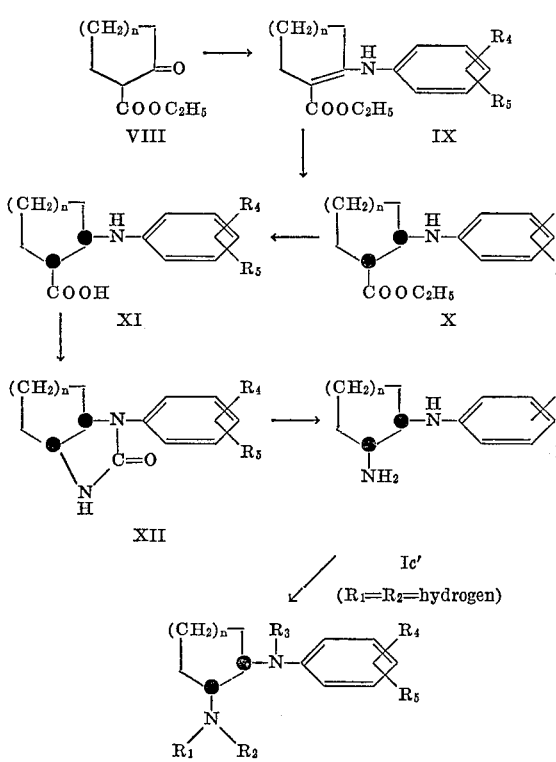

The compounds of Formula Ic when $R_3$ is hydrogen can also be alkylated (e.g., first acylated with formic acid or acyl halides or anhydrides of acetic, propionic, isobutyric or butyric acid and then reduced with lithium aluminum hydride, as shown in Method A), to give the corresponding cis-isomers of Formula Id:

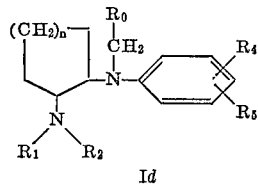

Method D for the compounds of Formulae Ie and If [compound I in which $m=2$; $R_1$ and $R_2$ are alkyl, benzyl or

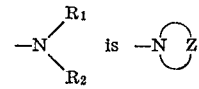

defined as above and $R_3$ is hydrogen (Ie) or $R_3$ is alkyl (If), in cis-isomer form]:

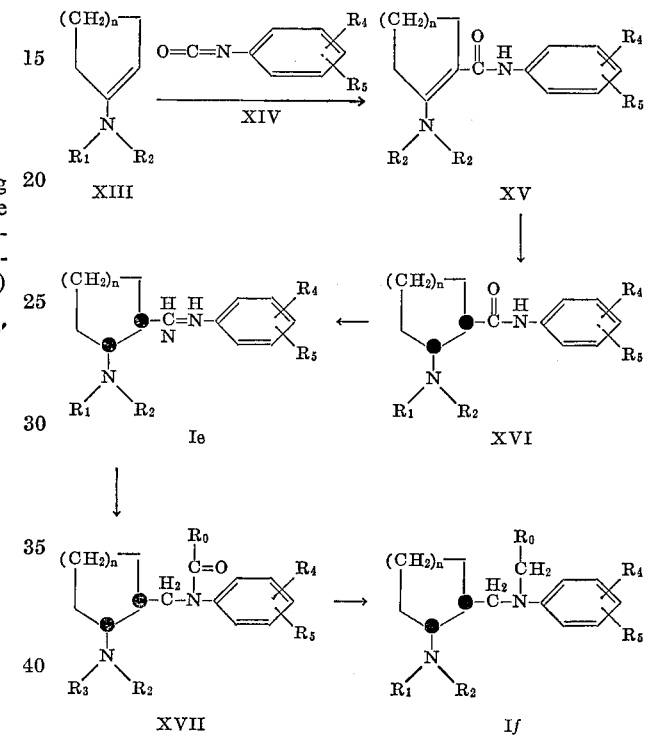

Method E for the compounds of Formula Ig (compound I in which $m=2$, trans-isomer form):

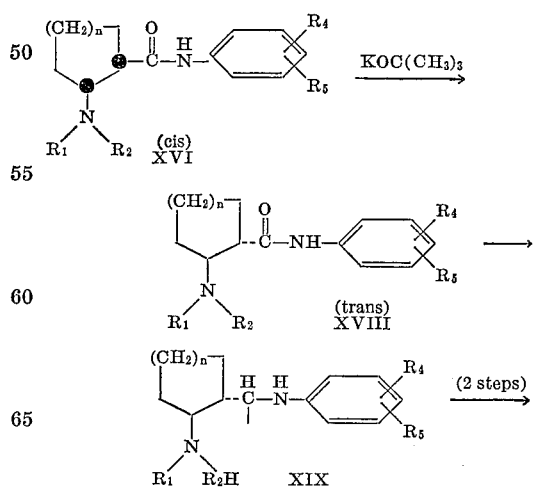

In the event that a compound of the Formulae Ih or Ij below is desired ($R_1=R_2=$hydrogen), preferably the following Method F is used:

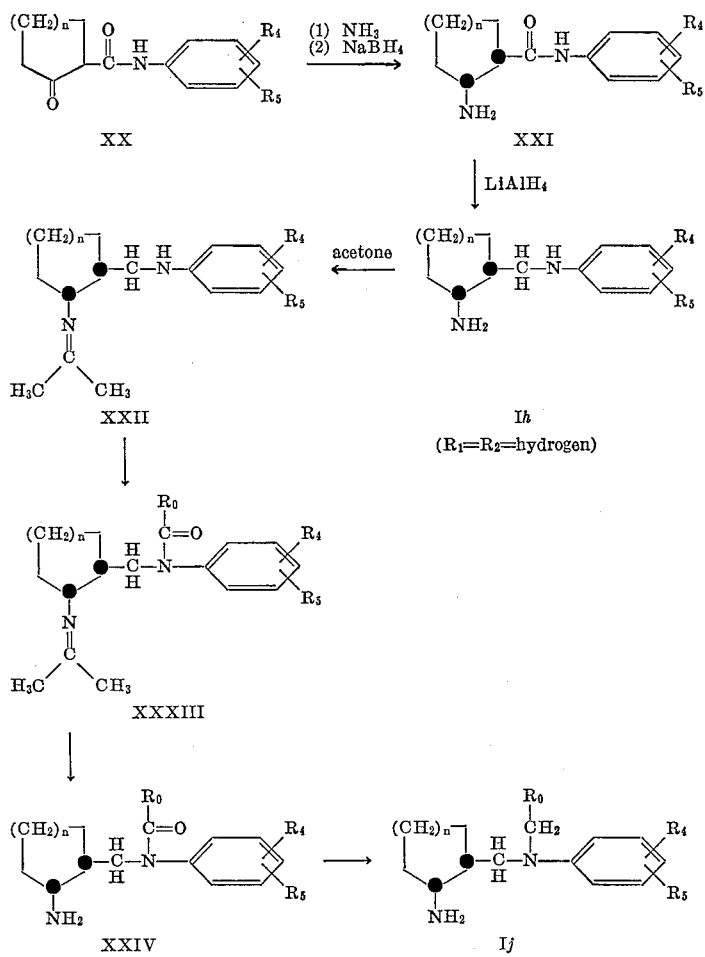

By substituting a monoalkylamine or benzylamine for ammonia in the first step of Method F (treatment of compound XX), secondary amino compounds are obtained, that is, compounds of Formula I in which $R_1$ is alkyl or benzyl and $R_2$ is hydrogen.

By submitting a compound of Formula XXI (which has a cis structure) to isomerization with potassium tertiary butoxide (Method E) the trans-isomer (XXXIa) of formula:

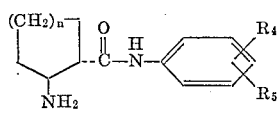 XXIa in which $n$, $R_4$ and $R_5$ are defined as before, is obtained.

Compound XXXIa when submitted to the same treatment as compound XXI in Method F produces the trans-isomeric compounds corresponding to Formulae Ih and Ij.

Substituting in Method F for compound Ih, the cis and trans isomers of Formula I in which $R_1$, $R_2$, and $R_3$ are hydrogen, $m$ is 1 and $n$, $R_4$, and $R_5$ are defined as above, namely, a compound of formula:

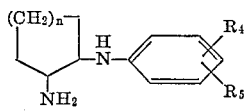

[trans form produced by Method B; cis form (Ic′) produced by Method C] is productive of compounds of the structure Ik:

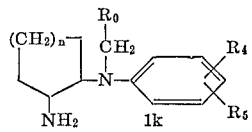

in which $n$, $R_0$, $R_4$ and $R_5$ have the significance as before (Formula Ik is regarded as representing both cis and trans forms).

The primary amino group of Ik can be converted to a secondary amino group, e.g., by direct alkylation with alkyl or benzyl chloride, bromide or iodide or by the process of acylation and reduction as shown before.

If $R_4$ and/or $R_5$ are hydroxy and interferences in the methods, above described, are encountered (as for example in Method D), the method can be carried out with the analogous methoxy-substituted starting material. The end product with the methoxy substituent can be submitted to demethylation, e.g., with benzene and aluminum chloride [illustratively using the procedure of Szmuszkovicz et al., J. Med. Chem. 9, 527 (1966)], or with hydrogen bromide (see Example 73), in order to obtain the desired hydroxy-substituted end product.

DESCRIPTION OF THE PREFERRED EMBODIMENTS

Examples of the cycloalkyl radical illustratively represented by the formula

are cyclopentyl, cyclohexyl, cycloheptyl and cyclooctyl.

Examples of the heterocyclicamino radical

having from 5 to 8 nuclear atoms, include: pyrrolidino, 2 - methylpyrrolidino, 2-ethylpyrrolidino, 2,2-dimethylpyrrolidino, 3,4-dimethylpyrrolidino, 2 - isopropylpyrrolidino, 2-sec.butylpyrrolidino, and like alkylpyrrolidino groups, morpholino, 2-ethylmorpholino, 2-ethyl-5-methylmorpholino, 3,3-dimethylmorpholino, 4-methylpiperazino, 4-butylpiperazino, piperidino, 2-methylpiperidino, 3-methylpiperidino, 4-methylpiperidino, 4-propylpiperidino, 2-propylpiperidino, 4-isopropylpiperidino, and like alkylpiperidino groups, hexamethyleneimino, 2-methylhexamethyleneimino, 3,6-dimethylhexamethyleneimino, heptamethyleneimino, octamethyleneimino and the like.

Illustrative examples of alkyl groups having from 1 to 4 carbon atoms, inclusive, are methyl, ethyl, propyl, isopropyl, butyl, isobutyl and the like.

Illustrative examples of alkoxy groups having from 1 to 4 carbon atoms, inclusive, are methoxy, ethoxy, propoxy, isopropoxy, butoxy, isobutoxy, and the like.

Under halogen substituents is understood fluorine, chlorine, bromine, and iodine.

The methods used for the production of the compounds of Formula I are as follows:

Method A for compounds of Formula I in which $m$ is 1 and the compound is obtained in the trans form.

In this method a chloro compound of Formula II (which may be obtained by reacting a 1,2-epoxycycloalkane with a secondary amine to give a trans-2-sec. amino-cyclohexanol which is then reacted with thionyl chloride to give the compound of Formula II) is reacted with aniline or a substituted aniline (Formula III) to give directly a compound of the Formula I$a$. Compound I$a$ can be acylated by a reaction with formic acid or an acyl halide or acid anhydride of acetic, propionic, isobutyric or butyric acid to give a compound of Formula IV which is reduced with a metal hydride such as lithium aluminum hydride, lithium dialuminum heptahydride, diborane or the like to give the compound of Formula I$b$.

In Method B, the same product I$a$ is produced by condensing first the aniline or substituted aniline with a 2-chlorocycloalkanone (V), to obtain a compound (VI) which is converted to an enamine (VII) and the latter reduced to give the compound of Formula I$a$.

In Method C the cis isomers of 1$a$ and 1$b$, namely 1$c'$ and 1$c$ are produced by condensing an alkyl (usually ethyl) 2-oxo-cycloalkanecarboxylate (VIII) with an aniline (III) to give the corresponding enamine IX; compound IX is catalytically reduced to give the corresponding alkyl 2-anilino-(substituted or unsubstituted)-cycloalkanecarboxylate (X) which is saponified to give the corresponding 2-anilinocycloalkanecarboxylic acid (XI). This acid XI is submitted in sequence to treatment with (1) alkyl chloroformate and triethylamine, (2) sodium azide, and (3) ethanol [a Finkelstein-Curtius reaction, Finkelstein et al., J. Med. Chem. 9, 319 (1966)] to give, in this case, the imide XII which by treatment with hydrochloric acid in ethanol gives the corresponding 1-amino-2-anilino-cycloalkane (1$c'$). Treatment of 1$c'$ with a 1,ω - diiodoalkane, e.g., 1,5 - diiodopentane, 1,6-diiodohexane, gives the corresponding 1 - heterocyclic-amino - 2 - anilinocycloalkane I$c'$ (compound I wherein $m=1$ and

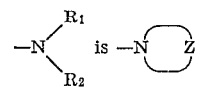

defined as before). Treatment of I$c'$ with alkyl halides, e.g., methyl, ethyl, propyl iodides or benzyl bromide produces alkyl or benzyl substitution of the hydrogens on both amino and imino groups of I$c'$, i.e., compounds of Formula I$c$ wherein $R_1$, $R_2$ and/or $R_3$ are alkyl or benzyl If more than one alkylated or benzylated product is obtained, separation by chromatography can be utilized. If a product I$c$ is desired in which $R_1$ and $R_2$ are hydrogen but $R_3$=alkyl or benzyl, temporary blocking of the primary amino group can be made by formation of a Schiff's base, followed by alkylation and decomposition of the Schiff's base (as shown in detail in Method F).

In Method D an enamine of Formula XIII is condensed with phenyl isocyanate or a substituted phenyl isocyanate XIV to give as immediate product a compound of Formula XV. Compound XV is first catalytically hydrogenated to give compound XVI and XVI is reduced with a metal hydride to give the compound of Formula I$e$. Compound I$e$ after reaction with formic acid or an acyl halide or acid anhydride and reduction with a metal hydride, gives the compound of Formula I$f$ (compound I wherein $m$ is 2, $R_3$ is alkyl and the compound is in the cis configuration).

In Method E a cis compound of Formula XVI is treated with potassium tertiary butoxide to give the corresponding trans compound of Formula XVIII. The trans compound XVIII is reduced to give a compound of Formula XIX which is acylated with formic acid or an acyl halide or acid anhydride and then reduced with a metal hydride to give the compound of Formula I$g$ (compound I wherein $m$ is 2, $R_3$ is alkyl and the compound is in the trans configuration).

In Method F a 2-(anilinocarbonyl)cycloalkanone XX is reacted with ammonia to give the corresponding vinylogous amide which is reduced with sodium borohydride to give compound XXI, which in turn is reduced with lithium aluminum hydride to give the 2-(anilinomethyl) cycloalkylamine (I$f$). The compound I$f$ treated with acetone forms the Schiff's base XXII, which is acylated with formic acid or an acid anhydride or acyl chloride to give the compound XXIII which is decomposed to give compound XXIV. Compound XXIV by reduction gives the corresponding 2-aminocycloalkyl-N-alkylanilinomethane [2-(N-alkylanilinomethyl)cycloalkylamine] (I$g$).

The compounds of Formua I (the compounds of Formulae I$a$, I$b$, I$c$, I$c'$, I$d$, I$e$, I$f$, I$g$, I$h$, I$j$, I$k$, and XIX are subgeneric to I) and their pharmacologically acceptable acid addition salts are useful as orally active antidiabetic agents. These compounds thus provide a means for the relief of diabetes without the necessity of injections. The novel compounds are not only capable of reducing blood sugar to a safe level for a considerable period of time, but in addition, also bring about satisfactory blood-sugar reduction at low dosage levels. For example, cis-1-{2-[N-methyl - p - anisidino)methyl] cyclohexyl}piperidine as dihydrochloride reduces blood sugar in rats by 20–30 percent when given orally in a dosage of only 6.25 mg. per kg. body weight.

For such oral administration the active compounds can be administered in liquid or solid dosage forms. Solid forms include capsules, tablets, powders, pills, and the like, and liquid forms include suitably flavored aqueous suspensions and solutions (depending on concentration desired), and flavored oil suspensions and solutions wherein edible oils, e.g., corn oil, cottonseed oil, coconut oil, peanut oil, sesame oil, or mixtures of these, and the like can be employed.

For preparing compositions such as tables and other compressed formulations the compositions can include any compatible and edible tableting material used in pharmaceutical practice, e.g., corn starch, lactose, stearic acid, magnesium stearate, talc, methyl cellulose, and the like.

Similarly, the compounds of the present invention can be mixed with suitable adjuvants for the preparation of resorbable hard gelatin or soft capsules utilizing conventional pharmaceutical practices.

The following illustrative composition is within the scope of the present invention:

(1) Hard gelatin capsules.—10,000 two-piece hard gelatin capsules for oral use, each containing 200 milligrams of cis-1-{2 - [(p - methoxyanilino)methyl]cyclohexyl}piperidine dihydrochloride are prepared from the following amounts and types of materials:

| | Gm. |
|---|---|
| Cis-1-{2-[(p-methoxyanilino)methyl]cyclohexyl}piperidine dihydrochloride | 2000 |
| Corn starch | 1616 |
| Mineral oil, U.S.P. | 129.6 |
| Magnesium stearate, powder | 162 |
| Talc, U.S.P. | 162 |

The finely powdered cis - 1 - {2-[(p-methoxyanilino)methyl]cyclohexyl}piperidine dihydrochloride is mixed throughly with the rest of the ingredients and then capsulated.

As noted above, the new compounds of Formula I can be used in the form of pharmacologically acceptable acid addition salts with inorganic or organic acids, for example, as hydrochlorides, hydrobromides, sulfates, hydroiodides, phosphates, citrates, lactates, tartrates, salicylates, cyclohexanesulfamates, pamoates, and the like. The acid addition salts can be prepared in conventional manner, for example, by reacting the selected acid with the selected free amine of Formula I, preferably in an aqueous or anhydrous solvent such as water, ether, methanol, ethanol, ethyl acetate or the like. Evaporation of the solvent provides the desired acid addition salt.

The novel compounds are also useful on account of their utility in the non-pharmaceutical field. For example, the fluosilicates of compounds of Formula I are useful as moth-proofing agents according to U.S. Pats. 1,915,334 and 2,075,359. The thiocyanates of the same compounds can be condensed with formaldehyde to form resinous polymers which according to U.S. Pats. 2,425,-320 and 2,606,155 are useful as pickling inhibitors. The trichloroacetates of the same compounds are useful as herbicides, for example against Johnson grass, yellow foxtail, green foxtail, Bermuda grass, and quack grass.

Finally, the compounds of Formula I are easily converted to quaternary ammonium salts with alkylating agents such as dialkyl sulfates and alkyl halides by conventional procedures. Thus obtained quaternary ammonium salts of the compounds of Formula I, particularly those having a lengthy alkyl chain from 8 to 20 carbon atoms, are useful for electrocardiographic jellies, on account of their wetting power and electroconductivity.

A suitable composition of an electrocardiographic jelly thus prepared comprises:

| | Parts |
|---|---|
| Glycerol | 5 |
| Starch | 10 |
| Quaternary ammonium salt | 60 |
| Water | 100 |

The jelly is prepared by mixing the starch, glycerol and water and then adding the quaternary ammonium salt. The mixture is then allowed to stand for at least two days with occasional agitation to allow the formation of a gel.

The starting materials for Method A are generally prepared by the following reactions:

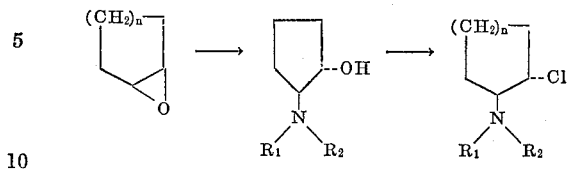

that is, a 1,2-epoxycycloalkane is reacted with a secondary amine defined as above and the resulting 2-hydroxyheterocyclicaminocycloalkane is reacted with thionyl chloride.

The starting materials for Method B are generally known in the art and can be produced, for example, by treating a selected 1,2-epoxycycloalkane with hydrogen chloride and thereafter oxidizing the thus - obtained chlorohydrin compound, or by direct chlorination of a selected cycloalkanone. There is further no difficulty to obtain the variously substituted aniline compounds of Formula III.

The starting materials for Method C, 2-oxocycloalkanecarboxylic acid lower-alkyl esters (usually ethyl esters) of Formula VIII are well-known in the art.

The starting materials for Method D are the enamines of cycloalkanones. These compounds are well known in the art and are prepared by reacting a cycloalkanone with a selected secondary amine.

In Method E the starting material is merely the intermediate XVI in Method D.

The starting material of Method F is obtained by hydrolyzing a vinylogous amide (XV) in which the group

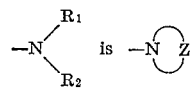

defined as before. This hydrolysis is best accomplished in a two-phase system, i.e., to a selected vinylogous amide (XV) in benzene solution is added an aqueous solution of hydrochloric acid at a controlled temperature, not exceeding about 35° C.

In carrying out Method A a selected 2-chlorocycloalkylamine (II) is reacted with aniline or a selected substituted aniline (III) to give the corresponding 2-anilinocycloalkylamine (Ia). In the preferred embodiment of this invention, the reaction is carried out in a nitrogen atmosphere at 100° C. (steam bath) and using the aniline in an excess so that the molar ratio between the starting material II and the aniline is about 1 to 2. The reaction takes from four to 48 hours. After the reaction is terminated the product is isolated and purified by conventional procedures, for example, by forming an acid addition salt of the desired compound and extracting organic impurities with organic solvents such as ether, benzene, or toluene, then converting the acid addition salt to the free base and extracing the product as a free base in an organic solvent, such as ether, tetrahydrofuran, benzene, and the like. The material can be further purified by additional recrystallization or distillation.

If a Formula Ib methyl derivative is wanted the compound Ia is refluxed with excess formic acid, then cooled and treated with sodium or potassium hydroxide at temperatures below 50° C. In this manner an N-(2-aminocycloalkyl)formanilide (IV, $R_0$ is hydrogen) is obtained. The thus-obtained product is isolated in conventional manner such as by extraction with ether, benzene, methylene chloride or the like. The compound can then be purified by additional extraction, crystallization or vacuum distillation.

The reduction of this product IV is carried out with a metal hydride such as lithium aluminum hydride, lithium aluminum heptahydride, diborane, or the like in solution such as tetrahydrofuran, generally at the refluxing temperature of the mixture. After the reaction is terminated, the material is decomposed with water and ice and the product isolated and purified in a conventional manner such as extraction or recrystallization, yielding a 1-[2-(substituted-N-methyl-anilino)-cycloalkyl]amine (Ib).

If, instead of the methyl-anilino compound above, a 1-[2-(substituted - N - alkyl-anilino)cycloalkyl]amine is desired in which the alkyl substituents are ethyl, propyl, butyl, isobutyl, or the like, the compounds of Formula Ia are treated with an acyl chloride or acid anhydride such as acetyl chloride, propionyl chloride, butyryl chloride or acetic anhydride, propionic anhydride, butyric anhydride or the like to give the corresponding anilide (IV in which $R_0$ is methyl, ethyl, propyl, isopropyl) and which is then reduced in the manner shown above with lithium aluminum hydride or other metal hydride to give the corresponding 1 - [2 - (substituted-N-alkylanilino)-cycloalkyl] amine (Ib).

In carrying out the Method B a mixture of a selected 2-chlorocycloalkanone (V), an equimolar amount of an aniline (III), a small amount of quinoline and larger amounts of sodium carbonate are refluxed in a solvent. In the preferred embodiment of the invention the reaction is carried out in a nitrogen atmosphere with a solvent such as methyl Cellosolve (ethylene glycol monomethyl ether), 1,2-dimethoxyethane, tetrahydrofuran, diethylene glycol dimethyl ether, and the like. The time of reaction is from 15 minutes to 3 hours and at the refluxing temperature of methyl Cellosolve between 30 to 60 minutes is sufficient. The quinoline is generally added in a quantity of $\frac{1}{10}$ equimolar with respect to the principal reagent, 2-chlorocycloalkanone. The sodium or potassium carbonate is generally used in a ratio of 1 to 2 moles per mole of 2-chlorocycloalkanone. After the reaction is terminated, the mixture is filtered and the filtrate evaporated and the remaining product dissolved in an organic solvent such as ethanol, methanol, 2-propanol or the like and recrystallized from this solution. The thus-obtained 2-substituted-anilinocycloalkanone (VI) can be first purified by conventional procedures such as additional recrystallization and extraction.

The enaminization of compound VI is carried out in a conventional manner such as by heating with a selected amine in the presence of an acid catalyst such as p-toluenesulfonic acid monohydrate. In the preferred procedure the amine is used in excess and a solvent such as benzene or toluene is used which with water produces an azeotropic system and thus allows separation of the water, formed during the reaction, with the aid of a reflux condenser equipped with a water trap.

The enamine (VII) thus obtained is without further purification reduced with a metal hydride such as sodium or potassium borohydride. The sodium or potassium borohydride is generally used in a solvent such as methanol or ethanol, and the mixture is stirred at room temperature for 1 to 24 hours. The desired 1-[2-(substituted anilino) cycloalkyl]amine Ia is obtained from the hydrogenation mixture by standard procedures such as extraction of the free amine with ether, methylene chloride or the like or from water solution as a salt. The free amine can further be purified by distillation in vacuo. As earlier shown, this free amine can be alkylated by treatment with formic acid or an acid halide or anhydride and subsequent reduction with lithium aluminum hydride.

In carrying out Method C a selected alkyl 2-oxocycloalkanecarboxylate (VIII) is enaminized with an aniline of the formula

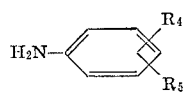

in which $R_4$ and $R_5$ are defined as above. The enaminization is carried out in a solvent such as benzene, toluene, xylene, or water-free lower alkanols, e.g., methanol, ethanol, butanol, and in the presence of a catalyst, preferably p-toluenesulfonic acid. The crude compound IX is obtained by evaporating the solvent.

Compound IX without further purification is then catalytically hydrogenated. In the preferred embodiment of this invention, compound IX is dissolved in methanol, from 0.5 to 2 parts by weight of catalyst for 100 parts of compound IX is added and the hydrogen pressure is adjusted to between 25–60 p.s.i. The preferred catalyst is platinum oxide. After the theoretical amount of hydrogen is absorbed, the reaction mixture is filtered to remove the catalyst and evaporated to give the compound X which without further purification is saponified with an alkali base, sodium or potassium hydroxide or an alkali carbonate or bicarbonate, in water, methanol or ethanol or mixtures thereof to give the acid of Formula XI. Compound XI (usually in suspension, e.g., in acetone) is treated with excess triethylamine at a temperature of —20 to +10° C., then with alkyl chloroformate, preferably ethyl chloroformate, in a quantity equimolecular to the triethylamine. The mixture is stirred and an alkali metal azide is added. The addition is preferably carried out at temperatures between +5 and —20° C. and with continuous agitation. The reaction period is between 1 to 4 hours. At the termination the product is recovered by conventional procedures, e.g., extraction and evaporation of the extract. The crude material is treated at reflux temperatures with ethanol, and then with a base such as sodium or potassium hydroxide during a period of 1 to 48 hours. The compound XII is obtained by conventional procedures, e.g., extraction combined with evaporation, chromatography, recrystallization and the like. By heating compound XII with aqueous acid for 1 to 6 hours and thereafter basifying the reaction mixture the 1-amino-2-anilino (or substituted anilino)-cycloalkane (Ic') is obtained. Treatment of compound Ic' with an equimolar amount of 1,ω-diiodoalkane, e.g., 1,4-diiodobutane, 1,5-diiodopentane or 1,6-diiodohexane in the presence of a base such as sodium or potassium carbonate gives the corresponding compound Ic wherein

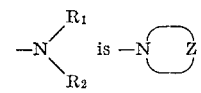

as defined above.

In carrying out Method D a solution of a selected phenyl isocyanate (XIV) and a selected 1-amino-1-cycloalkene (XIII) in an organic solvent such as benzene, toluene, cyclohexane or the like are heated together. In the preferred embodiment of this invention an equimolecular amount of the phenyl isocyanate and 1-amino-1-cycloalkene are used in a solvent which can also be used for the subsequent hydrogenation. The reaction is usually terminated between 15 minutes and 3 hours and is carried out in the preferred solvent, benzene, at the refluxing temperature of the reaction mixture. When the reaction is terminated, the solution containing the vinylogous amide XV is cooled and then hydrogenated at about 20 to 70 pounds of hydrogen pressure, in the presence of a platinum oxide catalyst, during a period of about 4 to 48 hours. After the theoretical amount of hydrogen has been absorbed, the mixture is filtered and the product isolated from the filtrate in conventional manner such as by extraction, crystallization, chromatography, or the like. The thus-produced compound is a cis - substituted-2-amino-cycloalkanecarboxanilide (XVI).

Compound XVI is reduced with a metal hydride such as lithium aluminum hydride in excess in a solvent such as ether, tetrahydrofuran or the like, preferably in a nitrogen atmosphere. The reduction is carried out at room temperature or below, and after a period of 30 to 60 minutes the mixture is heated from 4 to 48 hours, then cooled and decomposed by the addition of water and a base such as sodium hydroxide. The resulting suspension is filtered and the filtrate is worked up in conventional manner for the isolation of the product, cis-1-[2-(substituted anilinomethyl)cycloalkyl]amine (Ie). N-alkyl derivatives (If) are synthesized in the manner given in Method A, that is, treatment with formic acid or an acid chloride or acid anhydride (to give XVII) and subsequent reduction with a metal hydride to give If.

In carrying out Method E, cis-anilide XVI is refluxed in an organic solvent with sodium or potassium tertiary butoxide. In the preferred embodiment of this invention, the alkali metal tertiary butoxide is used in a slight excess of 1.1 to 1.5 molar equivalents for 1 molar equivalent of the anilide XVI. The reaction is carried out in a solvent such as tertiary butyl alcohol and the time of reflux is between 4 to 48 hours. In this manner, the trans-anilide XVIII is obtained. The product is isolated in conventional manner such as by extraction with ether, methylene chloride, chloroform, or the like. The product can further be purified by recrystallization, extraction and chromatography. In the manner shown in Method D the trans compound XVIII can be reduced to give the corresponding trans-1 - {2-[(substituted-anilino)methyl]cycloalkyl}-amine (XIX) which can be alkylated by the synthetic steps shown in Method A to give the compound Ig.

In carrying out Method F a 2-(anilinocarbonyl)cycloalkanone XX is treated with an hydrous ammonia in anhydrous methanol or ethanol at a temperature between 0° to about 40° C. At room temperature (about 24–26° C.) the corresponding vinylogous amide:

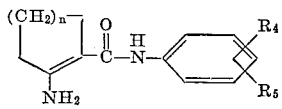

is formed during a period of 8 to 32 hours. This amide does not need to be isolated, but can be reduced in its alcoholic solution with sodium or potassium borohydride to give 2-amino-cycloalkanecarboxanilide XXI. These anilides of Formula XXI, as shown for the cis anilides XVI, are reduced with lithium aluminum hydride to give the corresponding 2-[(anilino or substituted anilino)methyl]cycloalkylamine (Ih). The compound of structure If is refluxed with excess acetone for 1 to 10 hours to give the Schiff's base XXII. Compound XXII, if treated as in Method A with formic acid, acyl halides or acid anhydrides of hydrocarbon carboxylic acids, forms the N-acyl Schiff's base XXIII. Compound XXIII is hydrolyzed with a dilute mineral acid at 10–40° C. to remove the isopropylidene group. Preferably, the hydrolysis is performed with aqueous dilute hydrochloric or hydrobromic acid at room temperature to give the 1-{2-[(N-acylanilino or substituted N - acylanilino)methyl] - cycloalkyl}amine (XXIV) which is reduced with a metal hydride as shown earlier to the corresponding 1-{2-[(N-alkylanilino or substituted N-alkylanilino)methyl]-cycloalkyl}amine (Ig).

The following examples are illustrative of the products and processes of the present invention.

*Example 1.—Trans-1-[2-(p-methoxyanilino)cyclohexyl] piperidine*

A mixture of 16.1 g. (0.08 mole) of trans-1-(2-chlorocyclohexyl)piperidine [V.Rericha, Chemical Abstracts 45, 576 (1951)] and 19.7 g. of p-anisidine (0.16 mole) was heated on the steam bath under a nitrogen atmosphere for 18 hours. The dark colored solution was poured while hot into an ice-cooled solution of 20 ml. of concentrated hydrochloric acid diluted to 100 ml. with water. The resulting solution was extracted once with ether, the ether extract being discarded. The acidic layer was cooled in ice, basified with 50 ml. of aqueous 40% potassium hydroxide solution and then twice extracted with ether. The ether extracts were combined, washed with water, then with saturated salt solution and dried by passage through anhydrous sodium sulfate. The thus-obtained filtrate was then evaporated to give 29.5 g. of an oily solid. Upon distillation at 0.05 mm. mecrcury pressure from an oil-jacketed flask there was first recovered p-anisidine, followed by 10.7 g. of a pale yellowish oil of B.P. 175–200° C. This oily material was crystallized from Skellysolve B hexanes to give 7.7 g. of the desired compound, M.P. 91–92° C. A second crop of 2.2 g. of the same material with the same melting point was obtained. The total yield of trans-1-[2-(p-methoxyanilino)-cyclohexyl]piperidine was 43%.

The ultraviolet spectrum showed $\lambda_{max.}$ 242 (11,500); 304 (1,900).

*Analysis.*—Calcd. for $C_{18}H_{28}N_2O$ (percent): C, 74.95; H, 9.79; N, 9.71. Found (percent): C, 74.83; H, 9.73; N, 9.80.

*Example 2.—Trans -1-[2-(o-chloroanilino) cyclopentyl]pyrrolidine*

In the manner given in Example 1, trans-1-(2-chlorocyclopentyl)pyrrolidine and o-chloroaniline were heated together to give trans - 1 - [2-(o-chloroanilino)cyclopentyl]pyrrolidine.

*Example 3.—Trans-1-[2-(p-trifluoromethylanilino) cycloheptyl]-3-methylpiperidine*

In the manner given in Example 1, trans-1-(2-chlorocycloheptyl) - 3 - methylpiperidine and p-trifluoromethylaniline were heated together to give trans-1-[2 - (p - trifluoromethylanilino)-cycloheptyl]-3-methylpiperidine.

*Example 4.—Trans-1-[2-(p-ethoxyanilino)cyclooctyl]-2,3-dimethylpiperidine*

In the manner given in Example 1, trans-1-(2-chlorocyclooctyl)-2,3-dimethylpiperidine and p - ethoxyaniline were heated together to give trans-1-[2-(p-ethoxyanilino) cyclooctyl]-2,3-dimethylpiperidine.

*Example 5.—Trans-1-[2-(p-bromoanilino)cyclohexyl]-3-ethylpyrrolidine*

In the manner given in Example 1, trans-1-(2-chlorocyclohexyl)-3-ethylpyrrolidine and p-bromoaniline were heated together to give trans-1-[2-(p-bromanilino)cyclohexyl]-3-ethylpyrrolidine.

*Example 6.—Trans-4-[2-(2-chloro-4-methoxyanilino) cyclohexyl]morpholine*

In the manner given in Example 1, trans-4-(2-chlorocyclohexyl)morpholine and 2 - chloro-4-methoxyaniline were heated together to give trans-4-[2-(2-chloro-4-methoxyanilino)cyclohexyl]morpholine.

*Example 7.—Trans-1-[2-(p-butoxyanilino)cyclopentyl]-4-methylpiperidine*

In the manner given in Example 1, trans-1-[2-chlorocyclopentyl)-2-butylpiperidine and p-isobutylaniline were heated together to give trans-1-[2-(p-butoxyanilino)cyclopentyl]-4-methylpiperidine.

*Example 8.—Trans-1-[2-(m-iodoanilino)cyclohexyl] heptamethyleneimine*

In the manner given in Example 1, trans-1-(2-chlorocyclohexyl)heptamethyleneimine and m-iodoaniline were heated together to give trans-1-[2-(m-iodoanilino)cyclohexyl]heptamethyleneimine.

*Example 9.—Trans-1-[2-(o-methylanilino)cycloheptyl] octamethyleneimine*

In the manner given in Example 1, trans-1-(2-chlorocycloheptyl)octamethyleneimine and o-methylaniline were heated together to give trans-1-[2-(o-methylanilino)cycloheptyl]octamethyleneimine.

*Example 10.—Trans-1-[2-(p-isobutylanilino)cyclopentyl]-2-butylpiperidine*

In the manner given in Example 1, trans-1-(2-chlorocyclopentyl)-4-methylpiperidine and p-butoxyaniline were heated together to give trans-1-[2-(p-isobutylanilino)cyclopentyl]-2-butylpiperidine.

*Example 11.—Trans-N-[2-(p-isopropylanilino)cyclopentyl]dibenzylamine*

In the manner given in Example 1, trans-N-(2-chlorocyclopentyl)dibenzylamine and p-isopropylaniline were heated together to give trans-N-[2-(p-isopropylanilino) cyclopentyl]dibenzylamine.

*Example 12.—Trans-N-[2-(p-propoxyanilino)cyclohexyl]dibutylamine*

In the manner given in Example 1, trans-N-(2-chlorocyclohexyl)dibutylamine and p - propoxyaniline were heated together to give trans-N-[2-(p-propoxyanilino)cyclohexyl]dibutylamine.

In the manner given in Example 1, other trans-[2-(substituted-anilino)cycloakyl]amines can be prepared by reacting a selected substituted aniline with a trans-(2-chlorocycloalkyl)amine. Representative products thus prepared include:
trans-1-[2-(o-bromoanilino)cyclopentyl]-2-butylpyrrolidine;
trans-1-[2-(m-trifluoromethylanilino)cyclopentyl]-4-ethylpiperazine;
trans-1-[2-(o-propylanilino)cyclopentyl]hexamethyleneimine;
trans-1-[2-(p-ethylanilino)cyclopentyl]octamethyleneimine;
trans-4-[2-(2,4-dimethylanilino)cyclopentyl]morpholine;
trans-1-[2-(2,4-diethylanilino)cyclohexyl]piperidine;
trans-1-[2-(m-isobutoxyanilino)cyclohexyl]-4-isopropylpiperidine;
trans-1-[2-(2,4-dibromoanilino)cyclohexyl]-4-methylpiperidine;
trans-1-[2-(p-ethoxyanilino)cyclohexyl]-2-methylpiperidine;
trans-4-[2-(3-butoxyanilino)cyclohexyl]-2-ethylmorpholine;
trans-1-[2-(o-trifluoromethylanilino)cycloheptyl]-2,2-dipropylpyrrolidine;
trans-1-[2-(3,5-dibromoanilino)cycloheptyl]-4-ethylpiperazine;
trans-1-[2-(3,5-diisopropylanilino)cycloheptyl]heptamethyleneimine;
trans-1-[2-(p-butylanilino)cycloheptyl]hexamethyleneimine;
trans-1-[2-(p-isobutoxyanilino)cycloheptyl]-3,4-dimethylpyrrolidine;
trans-1-[2-(2,4-diiodoanilino)cyclooctyl]-2-methylhexamethyleneimine;
trans-1-[2-(3,5-dichloroanilino)cyclooctyl]pyrrolidine;
trans-1-[2-(2-bromo-4-ethylanilino)cyclooctyl]piperidine;
trans-1-[2-(2-propyl-4-fluoroanilino)cyclooctyl]-4-isopropylpiperidine;
trans-4-[2-(3-fluoro-4-methylanilino)cyclooctyl]morpholine;
trans-1-(2-anilinocyclohexyl)piperidine;
trans-1-[2-(p-hydroxyanilino)cyclohexyl]piperidine; and the like.

*Example 13.—Trans-4'-methoxy-N-(2-piperidinocyclohexyl)formanilide*

A solution of 40 g. (0.139 mole) of trans-1-[2-(p-methoxyanilino)cyclohexyl]piperidine was refluxed for a period of 4 hours in 100 ml. of formic acid. The mixture was then cooled in ice and 400 g. of ice was added to the reaction mixture, followed by 700 ml. of 20% aqueous sodium hydroxide solution, keeping the temperature below 15° C. The mixture was extracted with ether and the extract was washed with water, then with saturated salt solution and dried by passage through sodium sulfate. The dried solution was thereupon evaporated to give a quantitative yield of product which crystallized from Skellysolve B hexanes to give trans-4'-methoxy-N-(2-piperidinocyclohexyl)formanilide of M.P. 86–87.5° C. Ultraviolet: $\lambda_{max.}$ 226 (13,850); 274 (1,600); 280 (1,400).

*Analysis.*—Calcd. for $C_{19}H_{28}N_2O_2$ (percent): C, 72.11; H, 8.92; N, 8.85. Found (percent): C, 71.97; H, 8.84; N, 8.90.

*Example 14.—Trans-1-[-2-(p-methoxy-N-methylanilino)cyclohexyl]piperidine*

A solution of 4.9 g. (0.0153 mole) of trans-4'-methoxy-N-(2-piperidinocyclohexyl)formanilide in 50 ml. of benzene was added to a solution of 4.9 g. of lithium aluminum hydride in 300 ml. of ether. The mixture was thereupon refluxed for 18 hours, cooled in ice and decomposed by successive addition of 5 ml. of water, 5 ml. of aqueous 15% sodium hydroxide solution, and 15 ml. of water. The mixture was then stirred for 2 hours, filtered and the filtrate evaporated to give 4.5 g. (97%) of product which was recrystallized from Skellysolve B hexanes to give colorless needles of trans-1-[2-(p-methoxy-N-methylanilino)cyclohexyl]piperidine of M.P. 106–107° C. Ultraviolet: $\lambda_{max.}$ 256 (13,900); 319 (2,000).

*Analysis.*—Calcd. for $C_{19}H_{30}N_2O$ (percent): C, 75.45; H, 10.00; N, 9.26. Found (percent): C, 75.22; H, 9.94; N, 9.39.

*Example 15.—Trans-1-[2-(o-chloro-N-methylanilino)cyclopentyl]pyrrolidine*

(A) Trans - 2' - chloro - N-(2-pyrrolidinocyclopentyl)formanilide.—In the manner given in Example 13, trans-1-[2-(o-chloroanilino)cyclopentyl]pyrrolidine was heated in formic acid to give trans-2'-chloro-N-(2-pyrrolidinocyclopentyl)formanilide.

(B) In the manner given in Example 14, trans-2'-chloro-N-(2-pyrrolidinocyclopentyl)formanilide was reduced with lithium aluminum hydride to give trans-1-[2-(o-chloro-N-methylanilino)cyclopentyl]pyrrolidine.

*Example 16.—Trans-1-[2-(p-trifluoromethyl-N-methylanilino)cycloheptyl]-3-methylpiperidine*

(A) Trans-4'-trifluoromethyl-N-[2 - (3 - methylpiperidino)cycloheptyl]formanilide.—In the manner given in Example 13, trans-1-[2-(p-trifluoromethylanilino)cycloheptyl]-3-methylpiperidine was heated in formic acid to give trans-4'-trifluoromethyl-N-[2-(3-methylpiperidino)cycloheptyl]formanilide.

(B) In the manner given in Example 14, trans-4'-trifluoromethyl - N - [2-(3-methylpiperidino)cycloheptyl] formanilide was reduced with lithium aluminum hydride to give trans-1-[2-(p-trifluoromethyl-N-methylanilino)cycloheptyl]-3-methylpiperidine.

*Example 17.—Trans-1-[2-(p-ethoxy-N-methylanilino)cyclooctyl]-2,3-dimethylpiperidine*

(A) Trans - 4' - ethoxy-N-[2-(2,3-dimethylpiperidino)cyclooctyl]formanilide.—In the manner given in Example 13, trans-1-[2-(p-ethoxyanilino)cyclooctyl]-2,3-dimethylpiperidine was heated in formic acid to give trans-4'-ethoxy - N - [2-(2,3-dimethylpiperidino)cyclooctyl]formanilide.

(B) In the manner given in Example 14, trans-4'-ethoxy - N - [2-(2,3-dimethylpiperidino)cyclooctyl]formanilide was reduced with lithium aluminum hydride to give trans-1-[2-(p-ethoxy-N-methylanilino)cyclooctyl]-2,3-dimethylpiperidine.

In the manner given in Examples 13 and 14, other trans - [2 - (substituted - N - methylanilino)cycloalkyl] amines are produced by reacting a trans-[2-(substituted-anilino)cycloalkyl]amine with formic acid and reducing the obtained formanilide with lithium aluminum hydride. Representative compounds thus obtained include:

trans-1-[2-(p-bromo-N-methylanilino)cyclohexyl]-3-ethylpyrrolidine;

trans-4-[2-(o-chloro-N-methylanilino)cyclohexyl]-3-methylmorpholine;

trans-1-[2-(m-iodo-N-methylanilino)cyclohexyl]heptamethyleneimine;

trans-N-[2-(p-propoxy-N-methylanilino)cyclohexyl] dibutylamine;

trans-1-[2-(2,4-diethyl-N-methylanilino)cyclohexyl] piperidine;

trans-1-[2-(m-isobutoxy-N-methylanilino)cyclohexyl]-4-isopropylpiperazine;

trans-1-[2-(2,4-dibromo-N-methylanilino)cyclohexyl]-4-methylpiperidine;

trans-1-[2-(p-ethoxy-N-methylanilino)cyclohexyl]-2-methylpiperidine;

trans-4-[2-(3-butoxy-N-methylanilino)cyclohexyl]-2-ethylmorpholine;

trans-1-[2-(p-butoxy-N-methylanilino)cyclopentyl]-4-methylpiperazine;

trans-1-[2-(p-isobutyl-N-methylanilino)cyclopentyl]-2-butylpiperazine;

trans-1-[2-(o-bromo-N-methylanilino)cyclopentyl]-2-butylpyrrolidine;

trans-1-[2-(m-trifluoromethyl-N-methylanilino)cyclopentyl]-4-ethylpiperazine;

trans-1-[2-(o-propyl-N-methylanilino)cyclopentyl]hexamethyleneimine;

trans-1-[2-(p-ethyl-N-methylanilino)cyclopentyl]octamethyleneimine;

trans-4-[2-(2,4-dimethyl-N-methylanilino)cyclopentyl] morpholine;

trans-1-[2-(o-trifluoromethyl-N-methylanilino)cycloheptyl]-2,2-dipropylpyrrolidine;

trans-1-[2-(3,5-dibromo-N-methylanilino)cycloheptyl]-4-ethylpiperazine;

trans-1-[2-(3,4-diisopropyl-N-methylanilino)cycloheptyl]heptamethyleneimine;

trans-1-[2-(p-butyl-N-methylanilino)cycloheptyl]hexamethyleneimine;

trans-1-[2-(p-isobutoxy-N-methylanilino)cycloheptyl]-3,4-dimethylpyrrolidine;

trans-1-[2-(2,4-diiodo-N-methylanilino)cyclooctyl]-2-methylhexamethyleneimine;

trans-1-[2-(3,5-dichloro-N-methylanilino)cyclooctyl] pyrrolidine;

trans-1-[2-(2-bromo-4-ethyl-N-methylanilino)cyclooctyl]piperidine;

trans-1-[2-(2-propyl-4-fluoro-N-methylanilino)cyclooctyl]-4-isopropylpiperidine;

trans-1-[2-(p-hydroxy-N-methylanilino)cyclohexyl] piperidine;

trans-4-[2-(3-fluoro-4-methyl-N-methylanilino)cyclooctyl]morpholine;

trans-1-[2-(N-methylanilino)cyclohexyl]piperidine; and the like.

*Example 18.—Trans-1-[2-(p-methoxy-N-ethylanilino) cyclohexyl]piperidine*

A mixture of 1.0 g. of trans-1-[2-(p-methoxyanilino) cyclohexyl]piperidine was heated with 5 ml. of acetic anhydride for 2 hours on the steam-bath. The reaction mixture was thereupon evaporated in vacuo, 25 ml. of water was added and the aqueous mixture was heated on the steam-bath for one hour. The mixture after cooling was extracted with three 25-ml. portions of ether, the ether extracts were combined, washed with dilute aqueous sodium hydroxide solution, dried over anhydrous magnesium sulfate and evaporated, to give trans-4'-methoxy-N-(2 - piperidinocyclohexyl)acetanilide. The acetanilide was reduced with lithium aluminum hydride in ether as shown in Example 14, to give trans-1-[2-(p-methoxy-N-ethylanilino)cyclohexyl]piperidine.

In the same manner given in Example 18 but replacing acetic anhydride by propionic, butyric and isobutyric anhydride yielded trans-1-[2-(p-methoxy-N-propylanilino)cyclohexyl]piperidine, trans - 1 - [2-(p-methoxy-N-butylanilino)cyclohexyl]piperidine, and trans - 1 - [2-(p-methoxy-N-isobutylanilino)cyclohexyl]piperidine, respectively.

*Example 19.—Trans-1-[2-(o-chloro-N-propylanilino) cyclopentyl]pyrrolidine*

In the manner given in Example 18, trans-1-[2-(o-chloroanilino)cyclopentyl]pyrrolidine was heated in propionic anhydride and the resulting product reduced with lithium aluminum hydride to give trans-1-[2-(o-chloro-N-propylanilino)cyclopentyl]pyrrolidine.

*Example 20.—Trans - 1 - [2-(p-trifluoromethyl-N-propylanilino)cycloheptyl]-3-methylpiperidine*

In the manner given in Example 18, trans-1-[2-(p-trifluoromethyl)cyclopentyl]-3-methylpiperidine was heated in propionic anhydride and the resulting product reduced with lithium aluminum hydride to give trans-1-[2-(p-trifluoromethyl - N - propylanilino)cyclopentyl]-3-methylpiperdine.

*Example 21.—Trans-1-[2-(p-ethoxy-N-ethylanilino) cycloheptyl]2,3-dimethylpiperidine*

In the manner given in Example 18, trans-1-[2-(p-ethoxyanilino)cyclopentyl]-2,3 - dimethylpiperidine was heated in acetyl chloride and pyridine and the resulting product reduced with lithium aluminum hydride to give trans - 1 - [2-(p-ethoxy-N-ethylanilino)cyclopentyl]-2,3-dimethylpiperidine.

In the same manner given in Example 18, other trans-[2-(substituted-N-alkylanilino)cycloalkyl]amines in which the N-alkyl group has from 2 to 4 carbon atoms, inclusive, can be prepared, such as:

trans-1-[2-(p-bromo-N-ethylanilino)cyclohexyl]-3-ethylpyrrolidine;

trans-4-[2-(2-chloro-4-methoxy-N-propylanilino)cyclohexyl]morpholine;

trans-1-[2-(p-butoxy-N-ethylanilino)cyclopentyl]-4-methylpiperazine;

trans-1-[2-(m-iodo-N-butylanilino)cyclohexyl]heptamethyleneimine;

trans-1-[2-(o-methyl-N-ethylanilino)cyclohexyl]octamethyleneimine;

trans-1-[2-(o-isobutyl-N-ethylanilino)cyclopentyl]-4-butylpiperazine;

trans-N-[2-(p-isopropyl-N-proplyanilino)cyclopentyl] dibenzylamine;

trans-N-[2-(p-propoxy-N-isobutylanilino)cyclohexyl] dibutylamine;

trans-1-[2-(p-bromo-N-ethylanilino)cyclohexyl]-3-ethylpyrrolidine;

trans-4-[2-(o-chloro-N-propylanilino)cyclohexyl] morpholine;

trans-1-[2-(m-iodo-N-ethylanilino)cyclohexyl]heptamethyleneimine;

trans-N-[2-(p-propoxy-N-butylanilino)cyclohexyl] dibutylamine;

trans-1-[2-(2,4-diethyl-N-isobutylanilino)cyclohexyl] piperidine;

trans-1-[2-(m-isobutoxy-N-ethylanilino)cyclohexyl]-4-isopropylpiperazine;

trans-1-[2-(2,4-dibromo-N-ethylanilino)cyclohexyl]-4-methylpiperidine;

trans-1-[2-(p-ethoxy-N-ethylanilino)cyclohexyl]-2-methylpiperidine;

trans-4-[2-(3-butoxy-N-propylanilino)cyclohexyl]-2-ethylmorpholine;

trans-1-[2-(p-butoxy-N-butylanilino)cyclopentyl]-4-methylpiperazine;

trans-1-[2-(p-isobutyl-N-butylanilino)cyclopentyl]-2-butylpiperazine;

trans-1-[2-(o-bromo-N-isobutylanilino)cyclopentyl]-2-butylpyrrolidine;

trans-1-[2-(N-ethylanilino)cyclohexyl]-2-propylpiperidine; and the like.

*Example 22.—Trans-1-[2-(p-methoxyanilino)cyclohexyl]piperidine by Method B*

(A) 2 - (p - anisidino)cyclohexanone.—A mixture of 132.6 g. (1 mole) of 2-chlorocyclohexanone, 123.2 g. (1 mole) of p-anisidine, 12.9 g. (0.1 mole) of quinoline, 158 g. (1.5 moles) of sodium carbonate, and 835 ml. of methyl Cellosolve was refluxed with stirring under nitrogen for a period of 45 minutes. The mixture was filtered while hot, and the filtrate evaporated to dryness. The residue was dissolved in 400 ml. of methanol and the thus-obtained solution was cooled in ice. The precipitated product was collected on a filter, washed with 50 ml. of ice-cold methanol followed by two washings with 100 ml. of ether, and thereupon dried. The dried 2-(p-anisidino)cyclohexanone consisted of pale yellow needles; 106.4 g. (48% yield); M.P. 100–102° C.

(B) *Enaminization of 2 - (p-anisidino)cyclohexanone with piperidine and reduction with sodium borohydride.*—A mixture of 21.9 g. (0.1 mole) of 2-(p-anisidino)cyclohexanone, 25.5 g. (0.3 mole) of piperidine, 0.2 g. of p-toluenesulfonic acid monohydrate, and 500 ml. of toluene was refluxed in a 1-l. flask equipped with a water trap. After one hour, 0.2 ml. of water was collected. An additional 0.5 g. of p-toluenesulfonic acid monohydrate was added and the refluxing was continued for 17 hours; a total of 1.2 ml. of water was collected. The remaining solution was then evaporated to dryness to give a residue which was dissolved in 50 ml. of ethanol. This solution was added to a suspension of sodium borohydride (22 g. in 500 ml. of ethanol) during a period of 20 minutes. The mixture was stirred for 20 hours, then evaporated to dryness on a steam bath in vacuo. To this residue was added 250 ml. of ether and 200 ml. of 10% hydrochloric acid. The resulting mixture was stirred for 1 hour. The acid layer was separated, cooled in ice, basified with 15% aqueous sodium hydroxide solution and extracted several times with ether. The combined extracts were washed successively with water and saturated salt solution, then dried over anhydrous magnesium sulfate and evaporated to give 23 g. of a brown oil which was distilled in an oil-jacketed flask at 0.4 mm. mercury pressure, providing the following fractions:

Fraction (1) weighing 4.6 g. and having a boiling point at 140–145° C. was found to be cis-2-piperidinocyclohexanol.

Fraction (2) weighing 8.82 g. and having a boiling point of 180–200° C. was recrystallized from 30 ml. of ice-cold methanol to give 4.64 g. of material melting at 88–89° C. Another recrytsallization from methanol at room temperature gave 4.5 g. of material of M.P. 91–92° C. which was trans-1-[2-(p-methoxyanilino)cyclohexyl]piperidine, identical with the product of Example 1.

*Analysis.*—Calcd. of $C_{18}H_{28}N_2O$ (percent): C, 74.95; H, 9.79; N, 9.71. Found (percent): C, 74.87; H, 9.99; N, 9.62.

This method for making trans-1-[2-(p-methoxyanilino)cyclohexyl]piperidine can be used to make other products which are trans-[2-(substituted-anilino)cycloalkyl]amines such as the compounds of Examples 2 through 12 and the like.

*Example 23.—Cis-1-[2-(p-methoxyanilino)cyclohexyl]piperidine*

(A) Cis - 2 - (p-methoxyanilino)cyclohexanecarboxylic acid.—The starting ester material employed herein was a mixture of the ethyl (about 65%) and methyl (about 35%) esters of 2-oxocyclohexanecarboxylic acid (Aldrich Chemical Company, Milwaukee, Wis.).

A mixture of the aforesaid ethyl and methyl 2-oxocyclohexanecarboxylates (85 g.), p-anisidine (61.5 g.; 0.5 mole) and 750 ml. of benzene was refluxed for 4 hours under nitrogen using an azeotropic separator (8.1 ml. of water was collected). The mixture was evaporated, the residue was dissolved in 600 ml. of ethanol, and hydrogenated during 17 hours in two portions, each in the presence of 5 g. of platinum oxide catalyst at an initial pressure of 53 lbs. of hydrogen. The combined mixture was filtered, evaporated and the residue was stirred with a mixture consisting of 500 ml. of ether and 500 ml. of 10% aqueous hydrochloric acid. The acid layer was separated, extracted once with 100 ml. of ether, cooled in ice and basified with 275 ml. of 20% aqueous sodium hydroxide solution, keeping the temperature below 10° C. The basic mixture was extracted with four 100-ml. portions of ether. The combined ether extract was washed with 100 ml. of saturated salt solution, dried over anhydrous magnesium sulfate and evaporated to give 100 g. of a brown oil, comprising ethyl and methyl cis-2-(p-methoxyanilino)cyclohexanecarboxylates.

A mixture consisting of the above mixed ethyl and methyl cis-2-(p-methoxyanilino)cyclohexanecarboxylates (5 g.) potassium hydroxide (5 g.), 25 ml. of water and 50 ml. of methanol was stirred at about 25° C. for 24 hours. The resulting solution was concentrated at about 35° C. and the concentrate was extracted with three 25-ml. portions of ether, the extracts being discarded. The remaining basic solution was adjusted to pH about 6, using 5 ml. of acetic acid. The resulting cloudy solution was extracted with four 50-mil. portions of methylene chloride. The combined extract was washed with 50 ml. of saturated salt solution, dried over anhydrous magnesium sulfate, and evaporated at about 35° C. to give 3.1 g. of brown cis-2-(p-methoxyanilino)cyclohexanecarboxylic acid of M.P. 154–155° C. Trituration with ether removed the brown color but did not change the melting point, nor did recrystallization of the triturated product from benzene change the melting point.

*Analysis.*—Calcd. for $C_{14}H_{19}NO_3$ (percent): C, 67.44; H, 7.68; N, 5.62. Found (percent): C, 67.96; H, 7.51; N, 5.43.

(B) The modified Curtius reaction with cis-2-(p-methoxyanilino)cyclohexanecarboxylic acid

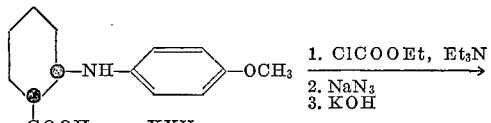

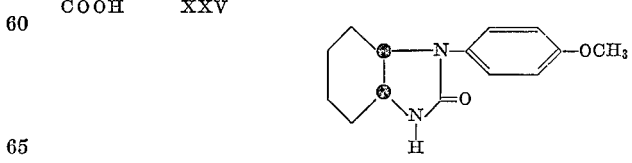

A solution of triethylamine (6.32 g.; 0.625 mole) in 45 ml. of acetone was added to a suspension of cis-2-(p-methoxyanilino)cyclohexanecarboxylic acid (6.23 g.; 0.025 mole) in 50 ml. of acetone at −5° C., and the mixture was stirred for 10 min. at this temperature. The resulting solution was treated during 10 minutes with a solution of ethyl chloroformate (6.78 g.; 0.0625 mole)

in 15 ml. of acetone and the thus-obtained suspension was stirred for 30 minutes at −5° to 0° C. A solution of sodium azide (2.4 g.; 0.037 mole) in 15 ml. of water was added during 5 minutes and the mixture was stirred at 0° C. for 2.5 hours. It was then poured into 15 ml. of saturated salt solution and the mixture was extracted with three 100-ml. portions of ether. The combined ether extract was dried over anhydrous magnesium sulfate and added to 250 ml. of absolute ethanol. The solution was distilled to get rid of the ether and then was refluxed overnight and evaporated to give 7 g. of a brown oil.

A mixture of this oil (2 g.), 11 ml. of 20% aqueous potassium hydroxide solution and 11 ml. of ethanol was refluxed for 20 hours. The solvent was then evaporated and the residue was extracted with a mixture of 100 ml. of ether and 20 ml. of methylene chloride. The organic layer was separated, washed with three 20-ml. portions of 10% hydrochloric acid, then with saturated salt solution, dried over anhydrous magnesium sulfate, and evaporated to give 0.6 g. of a product. Trituration of this product with ether gave 0.4 g. (31% yield) of cis-hexahydro-1-(p-methoxyphenyl) - 2 - benzimidozalinone (XXVI) as a colorless solid; M.P. 142–144° C., unchanged on recrystallization from ether.

Analysis.—Calcd. for $C_{14}H_{18}N_2O_2$ (percent): C, 68.27; H, 7.37; N, 11.37. Found (percent): C, 68.54; H, 7.39; N, 11.23.

(C) Cis-2-(p-methoxyanilino)cyclohexylamine and its dihydrochloride.—To a mixture of 75 ml. water and 75 ml. of 1 N aqueous hydrochloric acid was added 10 g. of cis-hexahydro-1-(p-methoxyphenyl) - 2 - benzimidazolinone (XXVI). The mixture was stirred and heated for 6 hours, then cooled and evaporated in vacuo to give white crystals of cis-2-(p-methoxyanilino)-cyclohexylamine dihydrochloride.

The dihydrochloride above was reacted with a slight excess of aqueous 10% sodium hydroxide solution. The aqueous mixture was extracted twice with methylene chloride. The methylene chloride fractions were combined, dried over anhydrous magnesium sulfate and evaporated, to give the free base cis-2-(p-methoxyanilino)cyclohexylamine of melting point 70–71.5° C.

(D) Cis - 1 - [2-(p-methoxyanilino)cyclohexyl]piperidine.—A mixture of cis-2-(p-methoxyanilino)cyclohexylamine (5 g.; 0.024 mole), 1,5-diiodopentane (7.4 g.; 0.024 mole), potassium carbonate (6.3 g.; 0.046 mole) and 50 ml. of ethanol was stirred and refluxed overnight. It was filtered, the solid washed with ethanol, and the combined filtrate and wash evaporated. The residue was dissolved in ether, and extracted with four 15-ml. portions of 10% hydrochloric acid. The acidic extract was backwashed once with water, cooled, basified with 20% aqueous sodium hydroxide solution, and extracted with methylene chloride. The organic extract was washed with saturated salt solution, dried over anhydrous magnesium sulfate and evaporated. The resulting oil (6.8 g.) was distilled at 0.2 mm. mercury pressure to give cis-1-[2-(p-methoxyanilino)cyclohexyl]piperidine of melting point 52–53.5° C.

By treating cis - 1 - [2-(p-methoxyanilino)cyclohexyl] piperidine with formic acid in accordance with the procedure of Example 13, and reducing the resulting cis-4'-methoxy - N - (2 - piperidinocyclohexyl)formanilide with lithium aluminum hydride in accordance with the procedure of Example 14, cis-1-[2-(p-methoxy-N-methylanilino)cyclohexyl]piperidine was obtained.

*Example 24.—Cis-2-(p-methoxyanilino)cyclohexylamine (alternative method)*

A mixture of 7.2 g. (0.05 mole) of 2-nitrocyclohexanone [Griswold et al., J. Org. Chem. 31, 357 (1966)], 6.2 g. of p-anisidine (0.5 mole) and 0.7 g. of p-toluenesulfonic acid in 75 ml. of toluene was refluxed for 3 hours. A total of 0.8 ml. of water was collected with an azeotropic separator. The mixture was then evaporated to dryness and the residue was recrystallized from ethanol to obtain 1-nitro-2-(p-methoxyanilino) - 1 - cyclohexene of M.P. 124–125° C.

This material was suspended in 200 ml. of ethanol and hydrogenated during 17 hours in the presence of 1 g. of plantinum oxide catalyst until 4 molar equivalents of hydrogen had been absorbed. The reaction mixture was then filtered to remove the catalyst, evaporated and the resulting residue redissolved in 15 ml. of ether and 10% aqeous hydrochloric acid. The ether-hydrochloric acid mixture was stirred for 30 minutes, the acid layer was then removed, basified with aqueous potassium hydroxide solution and extracted with ether. The ether extract was dried over anhydrous magnesium sulfate and evaporated to give an oily residue. This residue was distilled at 0.5 mm. mercury pressure. At this pressure 3.2 g. of a product distilling between 155 and 185° C. was obtained. The 3.2 g. of material was redistilled at 0.1 mm. of mercury pressure and the thus obtained material was crystallized and recrystallized from cold ether to give 0.85 g. of cis-2-(p-methoxyanilino)cyclohexylamine of melting point 70–71.5° C.

Analysis.—Calcd. for $C_{13}H_{20}N_2O$ (percent): C, 70.87; H, 9.15; N, 12.72. Found (percent): C, 70.97; H, 9.24; N, 12.93.

*Example 25.—Cis-2-(p-ethoxyanilino)cyclopentylamine*

In the manner given in Example 24, 2-nitrocyclopentanone, p-ethoxyaniline, p-toluenesulfonic acid and toluene were heated together to give 1-nitro-2-(p-ethoxyanilino)-1-cyclopentene which was hydrogenated to give cis-2-p-ethoxyanilino)cyclopentylamine.

In the manner given in Examples 24 and 25, other cis-2- (substituted-anilino)cycloalkylamines can be prepared such as:

cis-2-(o-bromoanilino)cyclopentylamine;
cis-2-(m-trifluoromethylanilino)cyclopentylamine;
cis-2-(o-propoxyanilino)cyclopentylamine;
cis-2-(p-ethylanilino)cyclopentylamine;
cis-2-(2,4-dimethoxyanilino)cyclopentylamine;
cis-2-(2,4-diethoxyanilino)cyclohexylamine;
cis-2-(m-isobutoxyanilino)cyclohexylamine;
cis-2-(2,4-dibromoanilino)cyclohexylamine;
cis-2-(p-ethoxyanilino)cyclohexylamine;
cis-2-(m-butoxyanilino)cyclohexylamine;
cis-2-(o-trifluoromethylanilino)cycloheptylamine;
cis-2-(3,5-dibromoanilino)cycloheptylamine;
cis-2-(3,5-diisopropoxyanilino)cycloheptylamine;
cis-2-(p-butoxyanilino)cycloheptylamine;
cis-2-(p-isobutoxyanilino)cycloheptylamine;
cis-2-(2,4-diiodoanilino)cyclooctylamine;
cis-2-(3,5-dichloroanilino)cyclooctylamine;
cis-2-(2-bromo-4-ethylanilino)cyclooctylamine;
cis-2-(2-propyl-4-fluoroanilino)cyclooctylamine;
cis-2-(3-fluoro-4-methylanilino)cyclooctylamine;
cis-2-(p-methoxyanilino)cyclooctylamine;
cis-2-(p-hydroxyanilino)cyclooctylamine; and the like.

The thus-obtained cis-2-(substituted-anilino)cycloalkylamines can be alkylated on the primary and secondary amine groups by treatment with alkyl halides, e.g. with methyl, ethyl, propyl, isopropyl, butyl or the like, iodides and bromides. Treatment of these amines with 1,ω-diiodo- or dibromoalkanes in which the alkane has from 4 to 8 carbon atoms, inclusive, e.g., 1,4-diiodobutane, 1,5-diiodopentane, 1,6-diiodohexane, 1,7-diiodoheptane, 1,8-diiodooctane in the presence of sodium or potassium carbonate produces the corresponding cis-1-[(2-substituted-anilino)cycloalkyl]heterocyclic-amines.

Example 26.—Cis-4'-methoxy-2-piperidinocyclohexanecarboxanilide

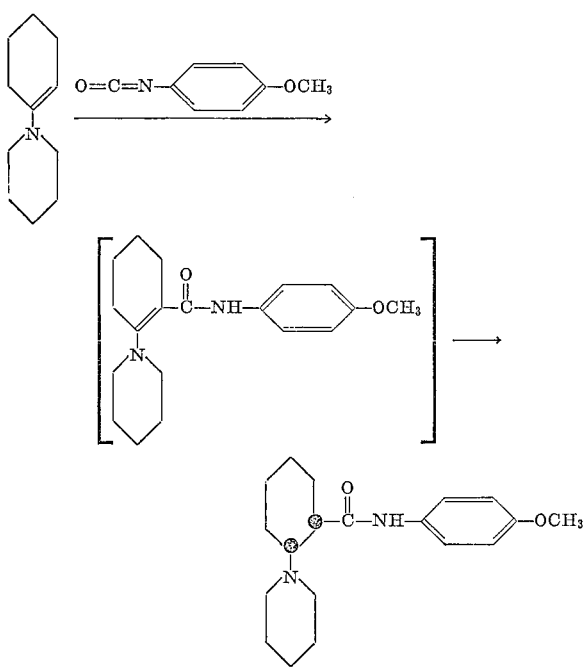

A solution of 59.6 g. (0.4 mole) of p-methoxyphenyl isocyanate in 200 ml. of benzene was added during 40 minutes to a refluxing solution of 1-piperidino-1-cyclohexene (67 g.; 0.4 mole) in 400 ml. of benzene. The mixture was allowed to reflux for 1.5 hours. The solution was then cooled and hydrogenated at 50 lb. initial hydrogen pressure in the presence of 2 g. of platinum oxide catalyst during a period of 19 hours. The theoretical amount of hydrogen was absorbed. The mixture was then filtered through a filter aid and the filtrate was evaporated to give a residue. The residue was stirred with 800 ml. of 10% hydrochloric acid and 400 ml. of ether during 1 hour; the acid layer was separated, cooled in ice and basified with 20% aqueous sodium hydroxide solution. This mixture was then extracted with 5 portions of 200 ml. each of methylene chloride. The methylene chloride extracts were combined, washed with saturated salt solution, dried over anhydrous sodium sulfate and evaporated. The thus-obtained residue was crystallized from 400 ml. of ice-cold ether to give colorless needles of M.P. 95–97° C. The total yield of cis-4'-methoxy-2-piperidinocyclohexanecarboxanilide was 83%.

*Analysis.*—Calcd. for $C_{19}H_{28}N_2O_2$ (percent): C, 72.11; H, 8.92; N, 8.85. Found (percent): C, 72.04; H, 8.63; N, 8.92.

Example 27.—Cis-1-{2 - [(p - methoxyanilino)methyl] cyclohexyl}-piperidine, its dihydrochloride and dihydrochloride ethanol solvate A suspension of 30 g. of lithium aluminum hydride in 1500 ml. of dioxane was heated on the steambath with stirring under nitrogen for 10 minutes. It was then cooled to room temperature and a solution of 31.6 g. (0.1 mole) of cis-4'-methoxy - 2 - piperidinocyclohexanecarboxanilide in 1 l. of dioxane was added during a period of 20 minutes. The mixture was then heated on the steambath for 20 hours. It was cooled in ice and decomposed by the successive addition of 30 ml. of water, 30 ml. of 15% aqueous sodium hydroxide solution and 90 ml. of water. A suspension was obtained which was filtered, the solids on the filter were washed with dioxane followed by ether, the filtrate and washings were combined and evaporated to dryness to give a residue. This residue was dissolved in 500 ml. of ether and treated with 500 ml. of 2.1 N ether solution of hydrogen chloride. The resulting precipitate was filtered and washed with ether, then recrystallized from absolute ethanol to give 29.8 g. (75%) of colorless needles which upon a second recrystallization from the same solvent gave pure cis-1-{2-[(p-methoxyanilino) methyl]cyclohexyl}piperidine dihydrochloride ethanol solvate.

*Analysis.*—Calcd. for $C_{19}H_{30}N_2O \cdot 2HCl \cdot 0.5C_2H_5OH$ (percent): C, 60.29; H, 8.86; Cl, 17.80; N, 7.03. Found (percent): C, 59.94; H, 8.69; Cl, 17.96; N, 7.30.

To 258 g. of cis-1-{2-[(p-methoxyanilino)methyl]cyclohexyl}piperidine dihydrochloride ethanol solvate prepared as described above were added 2.5 l. of 3A ethanol (95% ethanol denatured with methanol) and 2 l. of methanol. The mixture was heated at reflux for 2 hours; some solid material remained undissolved. The mixture was cooled at 5° C. for about 16 hours and then was filtered. The resulting filter cake was dried at 40° C., to obtain 189 g. of cis - 1-{2-[(p - methoxyanilino)methyl]cyclohexyl}piperidine dihydrochloride of melting point 242–245° C. (dec.).

*Analysis.*—Calcd. for $C_{19}H_{30}N_2O \cdot 2HCl$ (percent): C, 60.79; H, 8.59; Cl, 18.89; N, 7.47. Found (percent): C, 60.70; H, 8.40; Cl, 18.99; N, 7.94.

A mixture consisting of 50 g. of cis-1-{2-[(p-methoxyanilino) - methyl]cyclohexyl}piperidine dihydrochloride, 300 ml. of 10% aqueous sodium hydroxide solution, and 500 ml. of chloroform was stirred until all solid material had dissolved. The chloroform layer was separated, washed with water until the washings had pH about 7, dried and concentrated, to obtain 47 g. of an oil. The oil was dissolved in 150 ml. of Skellysolve B hexanes. The solution was filtered and cooled at −20° C. for 4 hours. The resulting solid was recovered by filtration, washed with Skellysolve B hexanes, and air dried to obtain 28 g. of cis-1-{2 - [(p - methoxyanilino)methyl]cyclohexyl}piperidine of melting point 41.9–42.8° C.

*Analysis.*—Calcd. for $C_{19}H_{30}N_2O$ (percent): C, 75.45; H, 10.00; N, 9.26. Found (percent): C, 75.37; H, 10.05; N, 9.29.

Example 28.—Cis-N-[(2-piperidinocyclohexyl)methyl]-p-formanisidide

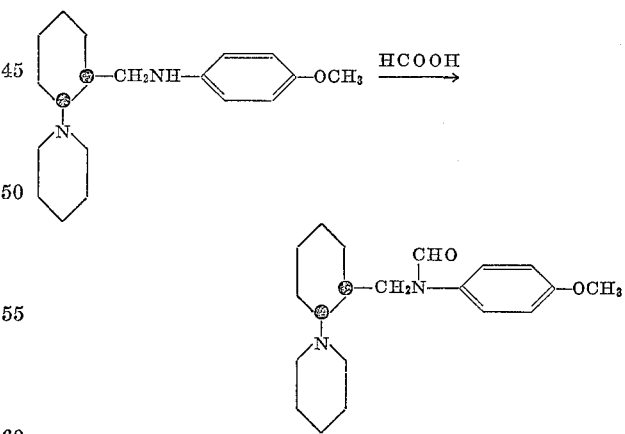

To 3 g. of cis-1-{2-[(p-methoxyanilino)methyl]cyclohexyl}-piperidine (as free base) was added 10 ml. of formic acid and the solution was heated on the steambath for 4 hours in a nitrogen atmosphere. The mixture was then cooled, 100 g. of ice and water was added and the solution was then basified with 50 ml. of 20% aqueous sodium hydroxide solution. The basic mixture was then extracted twice with 75 ml. of methylene chloride, the methylene chloride extracts washed with saturated salt solution, dried over anhydrous sodium sulfate, and evaporated to give an oily residue (3.3 g.). The oily residue solidified upon standing and this solidified material had a melting point of 102–105° C. The solid was recrystallized from Skellysolve B hexanes to give as colorless crystals, cis-N-[(2-piperidinocyclohexyl)methyl]-p-formanisidide of melting point 103.5–105° C. Ultraviolet: $\lambda_{max}$ 234 (12,000); sh. 276 (1,910).

*Analysis.*—Calcd. for $C_{20}H_{30}N_2O_2$ (percent): C, 72.69; H, 9:15; N, 8.48. Found (percent): C, 72.33; H, 8.99; N, 8.32.

*Example 29.—Cis-1-{2-[(p-methoxy-N-methylanilino) methyl]cyclohexyl}piperidine*

A solution of 27.2 g. (0.0825 mole) of cis-N-[(2-piperidinocyclohexyl)methyl]-p-formanisidide in 280 ml. of benzene was added during a period of 10 minutes to a solution of 27 g. of lithium aluminum hydride in 1600 ml. of ether under stirring in a nitrogen atmosphere. The mixture was refluxed for 21 hours, then cooled in ice and decomposed by adding in succession 27 ml. of water, 27 ml. of 15% aqueous sodium hydroxide solution, and 81 ml. of water. The decomposed mixture was filtered, the solid washed with ether and the filtrate and washings combined, dried over anhydrous sodium sulfate and evaporated to give 27 g. of a residue. This residue was dissolved in 100 ml. of petroleum ether (boiling range 30–60° C.) and then cooled in a freezer; 20.2 g. of material was collected on a filter. This material, unchanged after recrystallization, melted at 55–56° C. and was cis-1-{2-[(p - methoxy-N-methylanilino)methyl]cyclohexyl}piperidine. Ultraviolet: $\lambda_{max.}$ 253 (12,650); 321 (2,050).

*Analysis.*—Calcd. for $C_{20}H_{32}N_2O$ (percent): C, 75.90; H, 10.19; N, 8.85. Found (percent): C, 75.83; H, 10.27; N, 8.99.

Treatment of cis - 1-{2-[(p-methoxyanilino)methyl]cyclohexyl}-piperidine with acetic, propionic, butyric, or isobutyric anhydride and reducing the thus-formed amides with lithium aluminum hydride gives the corresponding cis-1-{2-[(N-ethyl (or propyl or butyl or isobutyl)-p-anisidino)methyl]cyclohexyl}piperidine.

*Example 30.—Cis-1-{2-[(o-chloroanilino)methyl]cyclopentyl}-pyrrolidine*

In the manner given in Example 26, o-chlorophenyl isocyanate was reacted at reflux with 1-pyrrolidino-1-cyclopentene in benzene, and the resulting product was hydrogenated in the presence of platinum oxide catalyst to give cis-2'-chloro-2-pyrrolidinocyclopentanecarboxanilide.

The anilide was then reduced with lithium aluminum hydride as in Example 27 to give cis-1-{2-[(o-chloroanilino)methyl]cyclopentyl}pyrrolidine.

*Example 31.—Cis-1-{2-[(p-trifluoromethylanilino) methyl]cycloheptyl}-3-methylpiperidine*

In the manner given in Example 26, p-trifluoromethylphenyl isocyanate was reacted at reflux with 1-(3-methylpiperidino)-1-cycloheptene in benzene, and the resulting product was hydrogenated in the presence of platinum oxide catalyst to give cis-4'-trifluoromethyl-2-(3-methylpiperidino)cycloheptanecarboxanilide.

The anilide was then reduced with lithium aluminum hydride as in Example 27 to give cis-1-{2-[(p-trifluoromethylanilino)methyl]cycloheptyl}-3-methylpiperidine.

*Example 32.—Cis-1-{2-[(p-ethoxyanilino)methyl]cyclooctyl}-2,3-dimethylpiperidine*

In the manner given in Example 26, p-ethoxyphenyl isocyanate was reacted at reflux with 1-(2,3-dimethylpiperidino)-1-cyclooctene in benzene, and the resulting product was hydrogenated in the presence of platinum oxide catalyst to give cis-4'-ethoxy-2-(2,3-dimethylpiperidino)cyclooctanecarboxanilide.

The anilide was then reduced with lithium aluminum hydride as in Example 27 to give cis-1-{2-[(p-ethoxyanilino)methyl]cyclooctyl}-2,3-dimethylpiperidine.

*Example 33.—Cis-1-{2-[(p-bromoanilino)methyl]cyclohexyl}-3-ethylpyrrolidine*

In the manner given in Example 26, p-bromophenyl isocyanate was reacted at reflux with 1-(3-ethylpyrrolidino)-1-cyclohexene in benzene, and the resulting product was hydrogenated in the presence of platinum oxide catalyst to give cis-4'-bromo-2-(3-ethylpyrrolidino)cyclohexanecarboxanilide.

The anilide was then reduced with lithium aluminum hydride as in Example 27 to give cis-1-{2-[(p-bromoanilino)methyl]cyclohexyl}-3-ethylpyrrolidine.

*Example 34.—Cis-1-{2-[(m-iodoanilino)methyl]cyclohexyl}heptamethyleneimine*

In the manner given in Example 26, m-iodophenyl isocyanate was reacted at reflux with 1-heptamethyleneimino-1-cyclohexene in benzene, and the resulting product was hydrogenated in the presence of platinum oxide catalyst to give cis-3'-iodo-2-heptamethyleneiminocyclohexanecarboxanilide.

The anilide was then reduced with lithium aluminum hydride as in Example 27 to give cis-1-{2-[(m-iodoanilino)methyl]cyclohexyl}heptamethyleneimine.

*Example 35.—Cis-1-{2-[(p-isobutylanilino)methyl] cyclopentyl}-4-butylpiperazine*

In the manner given in Example 26, p-isobutylphenyl isocyanate was reacted at reflux with 1-(4-butylpiperazino)-1-cyclopentene in benzene, and the resulting product was hydrogenated in the presence of platinum oxide catalyst to give cis - 4' - isobutyl - 2 - (4 - butylpiperazino)cyclopentanecarboxanilide.

The anilide was then reduced withi lithium aluminum hydride as in Example 27 to give cis-1-{2-[(p-isobutylanilino)methyl]-cyclopentyl}-4-butylpiperazine.

*Example 36.—Cis-N-{2-[(p-isopropylanilino)methyl] cyclopentyl}-dibenzylamine*

In the manner given in Example 26, p-isopropylphenyl isocyanate was reacted at reflux with 1-(dibenzylamino)-1-cyclopentene in benzene, and the resulting product was hydrogenated in the presence of platinum oxide catalyst to give cis - 4' - isopropyl - 2 - (dibenzylamino)cyclopentanecarboxanilide.

The anilide was then reduced with lithium aluminum hydride as in Example 27 to give cis-N-{2-[(p-isopropylanilino)methyl]-cyclopentyl}dibenzylamine.

In the manner given in Examples 26 and 27, other cis-2 - [(substituted - anilino)methyl]cycloalkylamines can be prepared by reacting selected substituted phenyl isocyanates with 1 - amino - 1 - cycloalkenes in benzene, catalytically hydrogenating and then reducing with lithium aluminum hydride. Representative compounds, thus obtained, include:

cis-4-{2-[(2-chloro-4-methoxyanilino)methyl]cyclopentyl}-morpholine;
cis-N-{2-[(p-isopropoxyanilino)methyl]cyclohexyl} dibutylamine;
cis-1-{2-[(o-methylanilino)methyl]cyclohexyl} heptamethyleneimine;
cis-1-{2-[(o-bromoanilino)methyl]cyclopentyl}-2-butylpyrrolidine;
cis-1-{2-[(m-trifluoromethylanilino)methyl]cyclopentyl}-4-ethylpiperazine;
cis-1-{2-[(o-propylanilino)methyl]cyclopentyl}hexamethyleneimine;
cis-1-{2-[(p-ethylanilino)methyl]cyclopentyl}octamethyleneimine;
cis-4-{2-[(2,4-dimethylanilino)methyl]cyclopentyl} morpholine;
cis-1-{2-[(2,4-diethylanilino)methyl]cyclohexyl} piperidine;
cis-1-{2-[(m-isobutoxyanilino)methyl]cyclohexyl}-4-isopropylpiperidine;
cis-1-{2-[(2,4-dibromoanilino)methyl]cyclohexyl}-4-methylpiperidine;
cis-1-{2-[(p-ethoxyanilino)methyl]cyclohexyl}-2-methylpiperidine;
cis-4-{2-[(m-butoxyanilino)methyl]cyclohexyl}-2-ethylmorpholine;

cis-1-{2-[(o-trifluoromethylanilino)methyl]cyclo-
    heptyl}-2,2-dipropylpyrrolidine;
cis-1-{2-[(3,5-dibromoanilino)methyl]cycloheptyl}-4-
    ethylpiperazine;
cis-1-{2-[(3,5-diisopropylanilino)methyl]cyclo-
    heptyl}-heptamethyleneimine;
cis-1-{2-[(p-butylanilino)methyl]cycloheptyl}hexa-
    methyleneimine;
cis-1-{2-[(p-isobutoxyanilino)methyl]cycloheptyl}-3,4-
    dimethylpyrrolidine;
cis-1-{2-[(2,4-diiodoanilino)methyl]cyclooctyl}-2-
    methylhexamethyleneimine;
cis-1-{2-[(3,5-dichloroanilino)methyl]cyclooctyl}-
    pyrrolidine;
cis-1-{2-[(2-bromo-4-ethylanilino)methyl]cyclooctyl}-
    piperidine;
cis-1-{2-[(2-propyl-4-fluoroanilino)methyl]cyclooctyl}-
    4-isopropylpiperidine;
cis-N-{2-[(p-methoxyanilino)methyl]cyclohexyl}-
    dibenzylamine;
cis-4-{2-[(3-fluoro-4-methylanilino)methyl]cyclooctyl}-
    morpholine; and the like.

The anilino compounds of Example 27 and Examples 30 through 36 can be transformed into N-methylanilino compounds by the process shown in Examples 28 and 29, that is, a methyl group is introduced by treating an anilino compound with formic acid and reducing the formyl compound with lithium aluminum hydride. The N-ethyl, N-propyl, N-butyl, and N-isobutyl compounds are produced by treating the anilino compounds with acetic, propionic, butyric, or isobutyric anhydride or acetyl, propionyl, butyryl, or isobutyryl chloride and pyridine, to obtain the corresponding amido compound and reducing the amido compound with lithium aluminum hydride. Representative compounds thus obtained include:

cis-1-{2-[(p-methoxy-N-ethylanilino)methyl]cyclo-
    hexyl}-piperidine;
cis-1-{2-[(p-trifluoromethyl-N-propylanilino)methyl]-
    cycloheptyl}-3-methylpiperidine;
cis-1-{2-[(p-ethoxy-N-propylanilino)methyl]cyclo-
    heptyl}-2,3-diethylpiperidine;
cis-1-{2-[(p-bromo-N-ethylanilino)methyl]cyclohexyl}-
    3-ethylpyrrolidine;
cis-4-{2-[(2-chloro-4-methoxy-N-propylanilino)methyl]-
    cyclohexyl}morpholine;
cis-1-{2-[(p-butoxy-N-ethylanilino)methyl]cyclo-
    pentyl}-4-methylpiperazine;
cis-1-{2-[(m-iodo-N-butylanilino)methyl]cyclohexyl}
    heptamethyleneimine;
cis-1-{2-[(o-methyl-N-ethylanilino)methyl]cyclohexyl}-
    octamethyleneimine;
cis-1-{2-[(o-isobutyl-N-ethylanilino)methyl]cyclopent-
    yl}-4-butylpiperazine;
cis-N-{2-[(p-isopropyl-N-propylanilino)methyl]cyclo-
    pentyl}-dibenzylamine;
cis-N-{2-[(p-propoxy-N-isobutylanilino)methyl]cyclo-
    hexyl}-dibutylamine;
cis-1-{2-[(p-bromo-N-ethylanilino)methyl]cyclohexyl}-
    3-ethylpyrrolidine;
cis-4-{2-[(o-chloro-N-propylanilino)methyl]cyclohexyl}-
    morpholine;
cis-1-{2-[m-iodo-N-methylanilino)methyl]cyclohexyl}-
    heptamethyleneimine;
cis-N-{2-[(p-propoxy-N-butylanilino)methyl]cyclohex-
    yl}-dibutylamine;
cis-1-{2-[2,4-diethyl-N-isobutylanilino)methyl]cyclo-
    hexyl}-piperidine;
cis-1-{2-[m-isobutoxy-N-ethylanilino)methyl]cyclohex-
    yl}-4-isopropylpiperazine;
cis-1-{2-[2,4-dibromo-N-ethylanilino)methyl]cyclohex-
    yl}-4-methylpiperidine;
cis-1-{2-[p-ethoxy-N-ethylanilino)methyl]cyclohexyl}-2-
    methylpiperidine;
cis-4-{2-[(3-butoxy-N-propylanilino)methyl]cyclohexyl}-
    2-ethylmorpholine;
cis-1-{2-[(p-butoxy-N-butylanilino)methyl]cyclopentyl}-
    4-methylpiperazine;
cis-1-{2-[(p-isobutyl-N-butylanilino)methyl]cyclopentl}-
    4-butlpiperazine;
cis-1-{2-[(o-bromo-N-isobutylanilino)methyl]cyclo-
    pentyl}-2-butylpyrrolidine; and the like.

*Example 37.—Trans-4'-methoxy-2-piperidinocyclo-
    hexanecarboxanilide*

A mixture of 120.8 g. (0.382 mole) of cis-4'-methoxy-2-piperidinocyclohexanecarboxanilide (Example 26), 47.5 g. (0.425 mole) of potassium tertiary butoxide, and 770 ml. of tertiary butyl alcohol was refluxed on the steambath for a period of 18 hours. The solution was cooled in ice, 1000 ml. of water was added, and the resulting suspension was extracted three times with 1-l portions of methylene chloride. The combined extracts were washed with water, followed by saturated salt solution, dried over anhydrous sodium sulfate, and evaporated to give 114 g. (94.5%) of solid residue. Vapor phase chromatography showed this material to be 96.18% trans compound and 3.44% unchanged cis compound. This material was first crystallized from methanol to give 85.4 g. of product having melting point 155–158° C. which was twice more recrystallized from methanol to give pure trans-4'-methoxy - 2-piperidinocyclohexanecarboxanilide of M.P. 161–162° C. Ultraviolet: $\lambda_{max.}$ 252 (15,950); sh. 288 (2,150); sh. 300 (1,100).

*Analysis.*—Calcd. for $C_{19}H_{28}N_2O_2$ (percent): C, 72.11; H, 8.92; N, 8.85. Found (percent): C, 71.83; H, 8.52; N, 8.98.

*Example 38.—Trans - 1-{2-[(p-methoxyanilino)methyl]
    cyclohexyl}-piperidine, its dihydrochloride and dihydrochloride methanol solvate*

A solution of 92.0 g. (0.292 mole) of trans-4'-methoxy-2-piperidinocyclohexanecarboxanilide in 2900 ml. of dioxane was added during 20 minutes to a solution of 92 g. of lithium aluminum hydride in 4600 ml. of dioxane under continuous stirring. The mixture was then heated on the steambath under nitrogen for 20 hours. It was then cooled in ice, and decomposed by adding in succession 92 ml. of water, 92 ml. of 15% aqueous sodium hydroxide solution, and 276 ml. of water. The resulting suspension was filtered and the solids washed with ether. The ether washing was added to the filtrate and the combined solution was dried over anhydrous magnesium sulfate and evaporated to dryness to give a brown oil. A solution of this oil in 1 l. of ether was added to 500 ml. of 1.9 N ethereal hydrogen chloride. A precipitate which resulted was recovered by filtration and washed with ether. It was recrystallized from 200 ml. of methanol and 200 ml. of ether to give 71.4 g. of trans-1-{2-[(p-methoxyanilino)methyl]cyclohexyl}piperidine dihydrochloride methanol solvate of M.P. 191–193° C. (yield 69%). Ultraviolet: $\lambda_{max}$ 236 ((13,300); (2,240).

*Analysis.*—Calcd. for $C_{19}H_{30}N_2O \cdot 2\ HCl \cdot 0.5\ CH_3OH$ (percent): C, 59.84; H, 8.76; Cl, 18.12; N, 7.16. Found (percent): C, 60.11; H, 8.82; Cl, 18.30; N, 7.57.

One gram of trans-1-{2-[(p-methoxyanilino)methyl] cyclohexyl}-piperidine dihydrochloride methanol solvate was heated to about 50° C. in a vacuum dessicator at a pressure of about 1 mm. of mercury for 4 days to give trans-1 - {2-[(p-methoxyanilino)methyl]cyclohexyl}-piperidine dihydrochloride.

To an aqueous solution of trans-1-{2-[(p-methoxyanilino)methyl]cyclohexyl}-piperidine dihydrochloride was added a 1N solution of sodium hydroxide until neutrality was obtained. The reaction mixture was then extracted with ether and the ether solution evaporated to give trans-1-{2-[(p-methoxyanilino)methyl]cyclohexyl}-piperidine.

*Example 39.—Cis-1-[2-(anilinomethyl)cyclohexyl]piperidine, and its trans isomer, and their dihydrochlorides*

(A) Cis - 2 - piperidinocyclohexanecarboxanilide.—In the manner given in Example 26, 1-piperidino-1-cyclohexene was refluxed with phenyl isocyanate in benzene. The resulting product was thereupon hydrogenated in the presence of platinum oxide catalyst to give cis-2-piperidinocyclohexanecarboxanilide.

(B) Cis-1-[2-(anilinomethyl)cyclohexyl]piperidine and its dihydrochloride.—In the manner given in Example 27, cis-2-piperidinocyclohexanecarboxanilide was reduced with lithium aluminum hydride in dioxane to give cis-1-[2-(anilinomethyl)cyclohexyl]piperidine which by treatment with hydrogen chloride in ether yielded cis-1-[2-(anilinomethyl)cyclohexyl]piperidine dihydrochloride of melting point 255–257° C.

*Analysis.*—Calcd. for $C_{18}H_{28}N_2 \cdot 2$ HCl (percent): C, 62.58; H, 8.75; N, 8.11. Found (percent): C, 62.85; H, 8.65; N, 8.29.

Treating the cis-2-piperidinocyclohexanecarboxanilide with potassium tertiary butoxide in tertiary butyl alcohol as in Example 37 produced the corresponding trans-2-piperidinocyclohexanecarboxanilide, which after reduction with lithium aluminum hydride and treatment with hydrogen chloride in ether, yielded trans-1-[2-(anilinomethyl)cyclohexyl]piperidine dihydrochloride. This material was twice recrystallized from ethanol to give trans-1-[2-(anilinomethyl)cyclohexyl]piperidine dihydrochloride ethanol solvate of melting point 163 to 164° C. with decomposition.

*Analysis.*—Calcd. for $C_{18}H_{28}N_2 \cdot 2HCl \cdot 0.5C_2H_5OH$ (percent):C, 61.91; H, 9.04; Cl, 19.27; N, 7.60. Found (percent): C, 61.95; H, 8.85; Cl, 19.19; N, 7.43.

Heating this solvate at 75° in a vacuum of one millimeter Hg for 4 days gave the unsolvated trans-1-[2-(anilinomethyl)-cyclohexyl]piperidine dihydrochloride.

*Example 40.—Trans-1-{-[(p-methoxy-N-methylanilino)methyl]-cyclohexyl}piperidine*

(A) Trans-N-[(2-piperidinocyclohexyl)methyl]-p-formanisidide.—An aqueous solution of 69 g. (0.176 mole) of trans-1-{2-[(p-methoxyanilino)methyl]cyclohexyl} piperidine dihydrochloride methanol solvate was basified and extracted with methylene chloride, and the extract was evaporated to give 54 g. of the free base as an oil. A solution of the oil in 176 ml. of formic acid was heated on a steambath for 3 hours and allowed to stand overnight for a period of about 20 hours. The mixture was then cooled in ice, basified with 850 ml. of 20% aqueuos sodium hydroxide solution and extracted twice with 1000-ml. portions of methylene chloride. The extracts were combined, washed with saturated salt solution, dried over anhydrous sodium sulfate and evaporated to give a residue. This residue was crystallized from ice-cold Skellysolve B hexanes to give 45.7 g. of material melting at 91.5 to 92.5° C. After additional recrystallization from Skellysolve B hexanes trans-N-[(2-piperidinocyclohexyl)methyl]-p-formanisidide of M.P. 92–93.5° C. was obtained. Ultraviolet: $\lambda_{max}$. 236 (11,350); sh. 279 (1,950).

*Analysis.*—Calcd. for $C_{20}H_{30}N_2O_2$ (percent): C, 72.69; H, 9.15; N, 8.48. Found (percent): C, 72.28; H, 9.36; N, 8.35.

(B) Trans-1-{-[(p-methoxy-N-methylanilino)methyl]-cyclohexyl}piperidine.—Five g. (0.15 mole) of trans-N-[(2-piperidinocyclohexyl)-methyl]-p-formanisidide in 50 ml. of benzene was dried by azeotropic distillation and then added during 5 minutes to a stirred solution of 5 g. of lithium aluminum hydride in 300 ml. of ether. The mixture was then refluxed under nitrogen for 21 hours. Thereafter the mixture was cooled in ice and decomposed by the successive addition of 5 ml. of water, 5 ml. of 15% aqueous sodium hydroxide solution, and 15 ml. of water. The thus-obtained suspension was filtered, the solid material washed with ether, the ether washings added to the filtrate, and the filtrate and washings were dried over anhydrous magnesium sulfate and evaporated to give 4.5 g. of a pale yellow oil. This pale yellow oil was distilled at 0.1 mm. mercury pressure from an oil-jacketed flask, giving 4.3 g. of oily trans-1-{2-[(p-methoxy-N-methylanilino)methyl]cyclohexyl}piperidine with a boiling point of 175 to 180° C. at this pressure. Ultraviolet: $\lambda_{max}$. 255 (12,650); 324 (2,250).

*Analysis.*—Calcd. for $C_{20}H_{32}N_2O$ (percent): C, 75.90; H, 10.19; N, 8.85. Found (percent): C, 76.24; H, 10.78; N, 8.98.

*Example 41.—Trans-2'-chloro-2-pyrrolidinocyclopentanecarboxanilide*

In the manner given in Example 37, cis-2'-chloro-2-pyrrolidinocyclopentanecarboxanilide was heated with potassium tert.butoxide in tert.butyl alcohol to give trans-2'-chloro-2-pyrrolidinocyclopentanecarboxanilide.

*Example 42.—Trans-4'-trifluoromethyl-2-(3-methylpiperidino)cycloheptanecarboxanilide*

In the manner given in Example 37, cis-4'-trifluoromethyl-2-(3-methylpiperidino) cycloheptanecarboxanilide was heated with potassium tert. butoxide in tert.butyl alcohol to give trans-4'-trifluoromethyl-2-(3-methylpiperidino)cycloheptanecarboxanilide.

*Example 43.—Trans-4'-ethoxy-2-(2,3-dimethylpiperidino)cyclooctanecarboxanilide*

In the manner given in Example 37, cis-4'-ethoxy-2-(2,3 - dimethylpiperidino)cyclooctanecarboxanilide was heated with potassium tert.butoxide in tert.butyl alcohol to give trans-4'-ethoxy-2-(2,3-dimethylpiperidino)cyclooctanecarboxanilide.

*Example 44.—Trans-4'-bromo-2-(3-ethylpyrrolidino)cyclohexanecarboxanilide*

In the manner given in example 37, cis-4'-bromo-2-(3-ethylpyrrolidino)cyclohexanecarboxanilide was heated with potassium tert.butoxide in tert.butyl alcohol to give trans - 4' - bromo - 2 - (3 - ethylpyrrolidino)cyclohexanecarboxanilide.

*Example 45.—Trans-3'-iodo-2-heptamethyleneimino-cyclohexanecarboxanilide*

In the manner given in Example 37, cis-3'-iodo-2-heptamethyleneiminocyclohexanecarboxanilide was heated with potassium tert.butoxide in tert.butyl alcohol to give trans-3'-iodo-2-heptamethyleneiminocyclohexanecarboxanilide.

*Example 46.—Trans-4'-isobutyl-2-(4-butylpiperazino)cyclopentanecarboxanilide*

In the manner given in Example 37, cis-4'-isobutyl-2-(4-butylpiperazino)cyclopentanecarboxanilide was heated with potassium tert.butoxide in tert.butyl alcohol to give trans - 4' - isobutyl - 2 - (4-butylpiperazino)cyclopentanecarboxanilide.

*Example 47.—Trans-4'-isopropyl-2-(benzylamino)cyclopentanecarboxanilide*

In the manner given in Example 37, cis-4'-isopropyl-2-(benzylamino)cyclopentanecarboxanilide was heated with potassium tert.butoxide in tert.butyl alcohol to give trans-4'-isopropyl-2-(benzylamino)cyclopentanecarboxanilide.

In the manner given in Example 37, other trans carboxanilides are obtained by isomerizing the corresponding cis carboxanilides with potassium tert.butoxide. Representative compounds, thus obtained, include:

trans-4'-isopropoxy-2-(dibutylamino)cyclohexanecarboxanilide;
trans-2'-chloro-4'-methoxy-2-morpholinocyclopentanecarboxanilide;
trans-4'-methyl-2-heptamethyleneiminocyclohexanecarboxanilide;
trans-2'-bromo-2-(2-butylpyrrolidino)cyclopentanecarboxanilide;

trans-3'-trifluoromethyl-2-(4-ethylpiperazino)cyclo-
 pentanecarboxanilide;
trans-2'-propyl-2-hexamethyleneiminocyclopentane-
 carboxanilide;
trans-4'-ethyl-2-octamethyleneiminocyclopentane-
 carboxanilide;
trans-2',4'-dimethyl-2-morpholinocyclopentanecarbox-
 anilide;
trans-2',4'-diethyl-2-piperidinocyclohexanecarboxanilide;
trans-3'-isobutoxy-2-(4-isopropylpiperidino)cyclohexane-
 carboxanilide;
trans-2',4'-dibromo-2-(4-methylpiperidino)cyclohexane-
 carboxanilide;
trans-4'-ethoxy-2-(2-methylpiperidino)cyclohexane-
 carboxanilide;
trans-3'-butoxy-2-(2-ethylmorpholino)cyclohexanecar-
 boxanilide;
trans-2'-trifluoromethyl-2-(2,2-dipropylpyrrolidino)
 cycloheptanecarboxanilide;
trans-3',5'-dibromo-2-(4-ethylpiperazino)cycloheptane-
 carboxanilide;
trans-3',5'-diisopropyl-2-heptamethyleneiminocyclo-
 heptanecarboxanilide;
trans-4'-butyl-2-hexamethyleneiminocycloheptane-
 carboxanilide;
trans-4'-isobutoxy-2-(3,4-dimethylpyrrolidino)cyclo-
 heptanecarboxanilide;
trans-2',4'-diiodo-2-(2-methylhexamethyleneimino)cy-
 clooctanecarboxanilide;
trans-2'-bromo-2-piperidinocyclooctanecarboxanilide;
trans-2'-bromo-4'-ethyl-2-piperidinocyclooctanecarbox-
 anilide;
trans-3',5'-dichloro-2-pyrrolidinocyclooctanecarbox-
 anilide;
trans-2'-propyl-4'-fluoro-2-(4-isoprpylpiperidino)cyclo-
 octanecarboxanilide;
trans-3'-ffuoro-4'-methyl-2-morpholinocyclooctane-
 carboxanilide; and the like.

*Example 48.—Trans-1-{2-[(o-chloroanilino)methyl]*
*cyclopentyl}pyrrolidine*

In the manner given in Example 38, trans-2'-chloro-2-pyrrolidinocyclopentanecarboxanilide was reduced with lithium aluminum hydride to give trans-1-{2-[(o-chloroanilino)methyl]cyclopentyl}pyrrolidine.

*Example 49.—Trans-1-{2-[(4-trifluoromethylanilino)*
*methyl]cycloheptyl}-3-methylpiperidine*

In the manner given in Example 38, trans-4'-trifluoromethyl - 2 - (3 - methylpiperidino)cycloheptanecarboxanilide was reduced with lithium aluminum hydride to give trans-1-{2-[(4 - trifluoromethylanilino)methyl]cycloheptyl}-3-methylpiperidine.

*Example 50.—Trans-1-{2-[(4-ethoxyanilino)methyl]*
*cyclooctyl}-2,3-dimethylpiperidine*

In the manner given in Example 38, trans-4'-ethoxy-2-(2,3-dimethylpiperidino)cyclooctanecarboxanilide was reduced with lithium aluminum hydride to give trans-1-{2-[(4 - ethoxyanilino)methyl]cyclooctyl} - 2,3 - dimethylpiperidine.

*Example 51.—Trans-1-{2-[(4-bromoanilino)methyl]*
*cyclohexyl}-3-ethylpyrrolidine*

In the manner given in Example 38, trans-4'-bromo-2-(3 - ethylpyrrolidino)cyclohexanecarboxanilide was reduced with lithium aluminum hydride to give trans-1-{2-[(4-bromoanilino)-methyl]cyclohexyl}-3-ethylpyrrolidine.

*Example 52.—Trans-1-{2-[(3-iodoanilino)methyl]*
*cyclohexyl}heptamethyleneimine*

In the manner given in Example 38, trans-3'-iodo-2-heptamethyleneiminocyclohexanecarboxanilide was reduced with lithium aluminum hydride to give trans-1-{2-[(3 - iodoanilino)methyl]cyclohexyl}heptamethyleneimine.

*Example 53.—Trans-1-{2-[(4-isobutylanilino)methyl]*
*cyclopentyl}-4-butylpiperazine*

In the manner given in Example 38, trans-4'-isobutyl-2 - (4 - butylpiperazino)cyclopentanecarboxanilide was reduced with lithium aluminum hydride to give trans-1-{2 - [(4 - isobutylanilino)methyl]cyclopentyl} - 4 - butylpiperazine.

*Example 54.—Trans-N-{2-[(4-isopropylanilino)methyl]*
*cyclopentyl}benzylamine*

In the manner given in Example 38, trans-4'-isopropyl - 2 - (benzylamino)cyclopentanecarboxanilide was reduced with lithium aluminum hydride to give trans-N-{2 - [(4 - isopropylanilino)methyl]cyclopentyl}benzylamine.

In the manner given in Example 38, other carboxanilide compounds can be reduced with lithium aluminum hydride to give the corresponding trans-{2-[(substituted-anilino)methyl]cycloalkyl}amines. Representative compounds, thus obtained, include:

trans-4-{2-[(2-chloro-4-methoxyanilino)methyl]-
 cyclopentyl}morpholine;
trans-N-{2-[(p-isopropoxyanilino)methyl]cyclo-
 hexyl}dibutylamine;
trans-1-{2-[(o-methylanilino)methyl]cyclohexyl}-
 heptamethyleneimine;
trans-1-{2-[(o-bromoanilino)methyl]cyclopentyl}-2-
 butylpyrrolidine;
trans-1-{2-[(m-trifluoromethylanilino)methyl]-
 cyclopentyl}-4-ethylpiperazine;
trans-1-{2-[(o-propylanilino)methyl]cyclopentyl}-
 hexamethyleneimine;
trans-1-{2-[(p-ethylanilino)methyl]cyclopentyl}octa-
 methyleneimine;
trans-4-{2-[(2,4-dimethylanilino)methyl]cyclopentyl}-
 morpholine;
trans-1-{2-[(2,4-diethylanilino)methyl]cyclohexyl}-
 piperidine;
trans-1-{2-[(m-isobutoxyanilino)methyl]cyclohexyl}-
 4-isopropylpiperidine;
trans-1-{2-[(2,4-dibromoanilino)methyl]cyclohexyl}-
 4-methylpiperidine;
trans-1-{2-[(p-ethoxyanilino)methyl]cyclohexyl}-
 2-methylpiperidine;
trans-4-{2-[(3-butoxyanilino)methyl]cyclohexyl}-
 2-ethylmorpholine;
trans-1-{2-[(o-trifluoromethylanilino)methyl]cyclo-
 heptyl}-2,2-dipropylpyrrolidine;
trans-1-{2-[(3,5-dibromoanilino)methyl]cyclo-
 heptyl}-4-ethylpiperazine;
trans-1-{2-[(3,5-diisopropylanilino)methyl]cyclo-
 heptyl}heptamethyleneimine;
trans-1-{2-[(p-butylanilino)methyl]cycloheptyl}-
 hexamethyleneimine;
trans-1-{2-[(p-isobutoxyanilino)methyl]cyclo-
 heptyl}-3,4-dimethylpyrrolidine;
trans-1-{2-[(2,4-diiodoanilino)methyl]cyclooctyl}-
 2-methylhexamethyleneimine;
trans-1-{2-[(3,5-dichloroanilino)methyl]cyclooctyl}-
 pyrrolidine;
trans-1-{2-[(2-bromo-4-ethylanilino)methyl]cyclo-
 octyl}piperidine;
trans-1-{2-[(2-propyl-4-fluoroanilino)methyl]cyclo-
 octyl}-4-isopropylpiperidine;
trans-4-{2-[(3-fluoro-4-methylanilino)methyl]cyclo-
 octyl}morpholine; and the like.

*Example 55.—Trans-1-{2-[(N-methyl-o-chloroanilino)*
*methyl]cyclopentyl}pyrrolidine*

In the manner given in Example 40A, treating trans-1-{2 - [(o - chloroanilino)methyl]cyclopentyl}pyrrolidine with formic acid at about 100° C. resulted in trans-N-[(2-pyrrolidinocyclopentyl)methyl]-o-chloroformanilide.

In the manner given in Example 40B, trans-N-[(2-pyrrolidinocyclopentyl)methyl] - o - chloroformanilide was reduced with lithium aluminum hydride to give trans-1 - {2 - [(N - methyl - o - chloroanilino)methyl]cyclopentyl}pyrrolidine.

*Example 56.—Trans-1-{2-[(N-methyl-p-trifluoromethylanilino)methyl]cycloheptyl}-3-methylpiperidine*

In the manner given in Example 40A, treating trans-1-{2 - [(p - trifluoromethylanilino)methyl]cycloheptyl}-3-methylpiperidine with formic acid at about 100° C. resulted in trans - N - {[2 - (3 - methylpiperidino)cycloheptyl]methyl}-p-trifluoromethylformanilide.

In the manner given in Example 40B, trans-N-{[2-(3-methylpiperidino)cycloheptyl]methyl} - p - trifluoromethylformanilide was reduced with lithium aluminum hydride to give trans-1-{2-[(N-methyl-p-trifluoromethylanilino)methyl]cycloheptyl}-3-methylpiperidine.

*Example 57.—Trans-1-{2-[(N-methyl-p-ethoxyanilino)methyl]cyclooctyl}-2,3-dimethylpiperidine*

In the manner given in Example 40A, treating trans-1-{2 - [(p - ethoxyanilino)methyl]cyclooctyl} - 2,3 - dimethylpiperidine with formic acid at about 100° C. resulted in trans - N - {[2 - (2,3 - dimethylpiperidino)cyclooctyl]methyl}-p-ethoxyformanilide.

In the manner given in Example 40B, trans-N-{[2-(2,3 - dimethylpiperidino)cyclooctyl]methyl} - p - ethoxyformanilide was reduced with lithium aluminum hydride to give trans - 1 - {2 - [(N - methyl - p - ethoxyanilino)methyl]cyclooctyl}-2,3-dimethylpiperidine.

*Example 58.—Trans-1-{2-[(N-methyl-p-bromoanilino)methyl]cyclohexyl}-3-ethylpyrrolidine*

In the manner given in Example 40A, treating trans-1-{2 - [(p-bromoanilino)methyl]cyclohexyl}-3-ethyl pyrrolidine with formic acid at about 100° C. resulted in trans-N - {[2-(3-ethylpyrrolidino)cyclohexyl]methyl}-p-bromoformanilide.

In the manner given in Example 40B, trans-N-{[2-(3-ethyl-pyrrolidino)cyclohexyl]methyl} - p-bromoformanilide was reduced with lithium aluminum hydride to give trans-1{2-[(N - methyl - p - bromoanilino)methyl]cyclohexyl}-3-ethylpyrrolidine.

*Example 59.—Trans-1-{2-[(N-methyl-m-iodoanilino)methyl]cyclohexyl}heptamethyleneimine*

In the manner given in Example 40A, treating trans-1-{2-[(m - iodoanilino)methyl]cyclohexyl}heptamethyeneimine with formic acid at about 100° C. resulted in trans-N - [(2 - heptamethyleneiminocyclohexyl)methyl]-m-idoformanilide.

In the manner given in Example 40B, trans-N-[(2-hepta-methyleneiminocyclohexyl)methyl] - m - iodoformanilidine was reduced with lithium aluminum hydride to give trans-1-{2-[(N - methyl-m-iodoanilidino)methyl]cyclohexyl}heptamethyleneimine.

*Example 60.—Trans-1-{2-[(N-methyl-p-isobutanylanilino)methyl]cyclopentyl}-4-butylpiperazine*

In the manner given in Example 40A, treating trans-1-{2-[(p-isobutylanilino)methyl]cyclopentyl} - 4 - butylpiperazine with formic acid at about 100° C. resulted in trans-N-{[2 - (4 - butylpiperazino)cyclopentyl]methyl}-p-isobutylformanilide.

In the manner given in Example 40B, trans-N-{[2-(4-butylpiperazino)cyclopentyl]methyl} - p - isobutyl formanilide was reduced with lithium aluminum hydride to give trans-1-{2-[(N - methyl-p - isobutylanilino)methyl]cyclopenytl}-4-butylpiperazine.

*Example 61.—Trans-N-{2-[(N-methyl-p-isopropylanilino)methyl]cyclopentyl}benzylamine*

In the manner given in Example 40A, treating trans-N-{2-[(p - isopropylanilino)methyl]cyclopentyl} - benzylamine with formic acid at about 100° C. resulted in trans-N-{[2 - (benzyamino)cyclopentyl]methyl} - p - isopropylformanilide.

In the manner given in Example 40B, trans-N-{[2-(benzylamino)cyclopentyl]methyl}-p - isopropylformanilide was reduced with lithium aluminum hydride to give trans-N{2-[(N-methyl - p - isopropylanilino)methyl]cyclopentyl}benzylamine.

*Example 62.—Trans-1-{2-[(o-chloro-N-ethylanilino)methyl]cyclopentyl}pyrrolidine*

In the manner given in Example 18, trans-1-{2-[(o-chloroanilino)methyl]cyclopentyl}pyrrolidine was heated with excess acetic anhydride to give trans-N-[(2-pyrrolidinocyclopentyl)methyl]-o-chloroacetanilide.

In the manner given in Example 14, the acetanilide was reduced with lithium aluminum hydride to give trans-1-{2-[(o - chloro-N - ethylanilino)methyl]cyclopenyl}pyrrolidine.

*Example 63.—Trans-1-{2-[(p-methoxy-N-ethylanilino)methyl]cyclohexyl}piperidine*

In the manner given in Example 18, trans-1-{2-[(p-methoxyanilino)methyl]cyclohexyl}piperidine was heated with excess acetic anhydride to give trans-N-[(2-piperidinocyclohexyl)methyl]-p-methoxyacetanilide.

In the manner given in Example 14, the acetanilide was reduced with lithium aluminum hydride to give trans-1-{2-[(p-methoxy - N - ethylanilino)methyl]cyclohexyl} piperidine.

*Example 64.—Trans-1-{2-[(p-methoxy-N-propylanilino)methyl]cyclohexyl}piperidine*

In the manner given in Example 18, trans-1-{2-[(p-methoxyanilino)methyl]cyclohexyl}piperidine was heated with excess propionic anhydride to give trans-N-[(2-piperidinocyclohexyl)methyl]-p-methoxypropionanilide.

In the manner given in Example 14, the propionanilide was reduced with lithium aluminum hydride to give trans-1 - {2-[(p-methoxy-N-isobutylanilino)methyl]cyclohexyl} piperidine.

*Example 65.—Trans-1-{2-[(p-methoxy-N-butylanilino)methyl]cyclohexyl}piperidine*

In the manner given in Example 18, trans-1-{2-[(p-methoxyanilino)methyl]cyclohexyl}piperidine was heated with excess butyric anhydride to give trans-N-[(2-piperidinocyclohexyl)methyl]-p-methoxybutyranilide.

In the manner given in Example 14, the butyranilide was reduced with lithium aluminum hydride to give trans-1-{2-[(p-methoxy - N - butylanilino)methyl]cyclohexyl} piperidine.

*Example 66.—Trans-1-{2-[(p-methoxy-N-isobutylanilino)methyl]cyclohexyl}piperidine*

In the manner given in Example 18, trans-1-{2-(p-methoxyanilino)methyl]cyclohexyl}piperidine was heated with excess isobutyric anhydride to give trans-N-[(2-piperidinocyclohexyl)methyl]-p-methoxyisobutyranilide.

In the manner given in Example 14, the isobutyranilide was reduced with lithium aluminum hydride to give trans-1 - {2-[(p-methoxy-N-isobutylanilino)methyl]cyclohexyl} piperidine.

*Example 67.—Trans-1-{2-[(o-propyl-N-ethylanilino)methyl]cyclopentyl}pyrrolidine*

In the manner given in Example 18, trans-1-{2-[(o-propylanilino)methyl]cyclopentyl}pyrrolidine was heated with excess acetic anhydride to give trans-N-[(2-pyrrolidinocyclopentyl)methyl]-o-propylacetanilide.

In the manner given in Example 14, the acetanilide was reduced with lithium aluminum hydride to give trans-1-{2-[(o-propyl - N - ethylanilino)methyl]cyclopentyl}pyrrolidine.

*Example 68.—Trans-1-{2-[(p-trifluoromethyl-N-propylanilino)methyl]cycloheptyl}-3-methylpiperidine*

In the manner given in Example 18, trans-1-{2-[(p-trifluoromethylanilino)methyl]cycloheptyl} - 3 - methyl piperidine was heated with excess propionic anhydride to give trans-N-{[2-(3-methylpiperidino)cycloheptyl]methyl}-p-trifluoromethylpropionanilide.

In the manner given in Example 14, the propionanilide was reduced with lithium aluminum hydride to give trans-1 - {2-[(p-trifluoromethyl-N-propylanilino)methyl] cycloheptyl}-3-methylpiperidine.

*Example 69.—Trans-1-{2-[(p-ethoxy-N-butylanilino) methyl]cyclooctyl}-2,3-dimethylpiperidine*

In the manner given in Example 18, trans-1-{2-[(p-ethoxyanilino)methyl]cyclooctyl}-2,3 - dimethylpiperidine was heated with excess butyric anhydride to give trans-N-{[2 - (2,3 - dimethylpiperidino)cyclooctyl]methyl} - p-ethoxybutyranilide.

In the manner given in Example 14, the butyranilide was reduced with lithium aluminum hydride to give trans-1-{2-[(p-ethoxy-N-butylanilino)methyl]cyclooctyl} - 2,3-dimethylpiperidine.

In the manner given in Examples 18 and 14, other trans - {2-[(substituted-N-alkylanilino)methyl]cycloalkyl} amines can be obtained by treating selected trans-{2-[(substituted-anilino)-methyl]cycloalkyl}amines with an acid anhydride and reducing the obtained anilide with lithium aluminum hydride. Representative compounds, thus obtained, include:

trans-1-{2-[(p-trifluoromethyl-N-propylanilino)methyl] cycloheptyl}-3-methylpiperidine;
trans-1-{2-[(p-ethoxy-N-propylanilino)methyl]cycloheptyl}-2,3-diethylpiperidine;
trans-1-{2-[(p-bromo-N-ethylanilino)methyl]cyclohexyl}-3-ethylpyrrolidine;
trans-4-{2-[(2-chloro-4-methoxy-N-propylanilino)methyl]cyclohexyl}morpholine;
trans-1-{2-[p-butoxy-N-ethylanilino)methyl]cyclopentyl}-4-methylpiperazine;
trans-1-{2-[(m-iodo-N-butylanilino)methyl]cyclohexyl} heptamethyleneimine;
trans-1-{2-[(o-methyl-N-ethylanilino)methyl]cyclohexyl} octamethyleneimine;
trans-1-{2-[(o-isobutyl-N-ethylanilino)methyl]cyclopentyl}-4-butylpiperazine;
trans-N-{2-[(p-isopropyl-N-propylanilino)methyl]cyclopentyl}benzylamine;
trans-N-{2-[(p-propoxy-N-isobutylanilino)methyl]cyclohexyl}dibutylamine;
trans-1-{2-[(p-bromo-N-ethylanilino)methyl]cyclohexyl}-3-ethylpyrrolidine;
trans-4-{2-[(o-chloro-N-propylanilino)methyl]cyclohexyl}morpholine;
trans-1-{2-[(m-iodo-N-methylanilino)methyl]cyclohexyl}heptamethyleneimine;
trans-N-{2-[(p-propoxy-N-butylanilino)methyl]cyclohexyl}dibutylamine;
trans-1-{2-[(2,4-diethyl-N-isobutylanilino)methyl]cyclohexyl}piperidine;
trans-1-{2-[(m-isobutoxy-N-ethylanilino)methyl]cyclohexyl}-4-isopropylpiperazine;
trans-1-{2-[(2,4-dibromo-N-ethylanilino)methyl]cyclohexyl}-4-methylpiperidine;
trans-1-{2-[(p-ethoxy-N-ethylanilino)methyl]cyclohexyl}-2-methylpiperidine;
trans-4-{2-[(3-butoxy-N-propylanilino)methyl]cyclohexyl}-2-ethylmorpholine;
trans-1-{2-[(p-butoxy-N-butylanilino)methyl]cyclopentyl}-4-methylpiperazine;
trans-1-{2-[(p-isobutyl-N-butylanilino)methyl]cyclopentyl}-4-butylpiperazine;
trans-1-{2-[(o-bromo-N-isobutylanilino)methyl]cyclopentyl}-2-butylpyrrolidine; and the like.

Treating the before-shown compounds of formula::

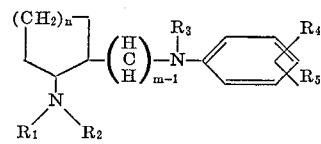

wherein $n$ is 1 to 4, inclusive; wherein $m$ is 1 or 2; wherein $R_1$ and $R_2$ are selected from the group consisting of hydrogen, alkyl having from 1 to 4 carbon atoms, inclusive, and benzyl or wherein the group

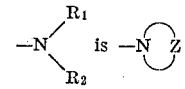

in which

represents a heterocyclic amino radical containing from 5 to 9 nuclear atoms, inclusive; wherein $R_3$ is selected from the group consisting of hydrogen, alkyl as defined above, and benzyl; and wherein $R_4$ and $R_5$ are selected from the group consisting of hydrogen, alkyl and alkoxy having from 1 to 4 carbon atoms, inclusive, hydroxy, halogen and —$CF_3$, with the proviso that when $m$ is 1 and

is other than

at least one of $R_4$ and $R_5$ is selected from the group consisting of hydroxy, alkoxy as defined above, halogen and —$CF_3$, with an inorganic or organic acid, and particularly with a pharmacologically acceptable acid produces useful salts, such as the hydrochlorides, hydrobromides, hydroiodides, sulfates, perchlorates, formates, acetates, lactates, tartrates, citrates, maleates, benzoates, trichloroacetates, trifluoroacetates, methanesulfonates, ethanesulfonates, benzensulfonates, p-toluenesulfonates, p-chlorobenzenesulfonates, p-ethylbenzenesulfonates and the like, of the foregoing amines.

*Example 70.—Cis - 2-amino-N-(p-methoxyphenyl)cyclohexanemethylamine and its bis(cyclohexanesulfamate)*

(A) 2 - oxo - p - cyclohexanecarboxanisidide.—4'-methoxy-2-piperidino-1-cyclohexenecarboxanilide (Example 26, first step) (0.602 mole) in 1012 ml. of benzene was treated with 450 ml. of aqueous hydrochloric acid (10% by weight) dropwise with stirring so that the temperature did not exceed 35° C. The mixture was then stirred for 1 hour and filtered through a filter aid. The organic layer was separated, the aqueous layer was extracted once with methylene chloride and the combined organic extract was washed with water, saturated salt solution, dried over anhydrous sodium sulfate and evaporated. The thus-obtained residue (129 g.) was crystallized from 250 ml. of benzene to give 97 g. of 2-oxo-p-cyclohexanecarboxanisidide of melting point 117–121° C., unchanged on recrystallization. Ultraviolet: $\lambda_{max}$ 251 (14,650); sh. 287 (4,700); sh. 297 (3,150).

*Analysis.*—Calcd. for $C_{14}H_{17}NO_3$ (percent): C, 67.99; H, 6.93; N, 5.66. Found (percent): C, 68.58; H, 7.54; N, 6.07.

(B) 2-amino-p-(1-cyclohexene)carboxanisidide.—To a solution of 10 g. of anhydrous ammonia in 100 ml. of ethanol was added 4.94 g. (0.02 mole) of 2-oxo-p-cyclohexanecarboxanisidide. The flask was stoppered and the mixture stirred magnetically overnight. The resulting solution was evaporated to give 4 g. of solid which was recrystallized from ether to give pure 2-amino-p-(1-cyclohexene)carboxanisidide of melting point 128–129.5° C. Ultraviolet: sh. 249 (6,550); $\lambda_{max.}$ 298 (27,600).

*Analysis.*—Calcd. for $C_{14}H_{18}N_2O_2$ (percent): C, 68.27; H, 7.37; N, 11.36. Found (percent): C, 68.20; H, 7.15; N, 11.37.

(C) Cis-2-amino - p-cyclohexanecarboxanisidide.—Sodium borohydride (1.7 g.) was added to a solution of 1.7 g. (0.0069 mole) 2-amino-p-(1-cyclohexene)carboxanisidide in 75 ml. of ethanol, and the mixture was stirred overnight. It was evaporated and 25 ml. each of water and ether were added. The ether layer was separated and stirred with 20 ml. of 10% hydrochloric acid for 1 hour. The acid layer was separated, cooled in ice, basified with 20% aqueous sodium hydroxide solution and extracted with ether. The ether extract was washed with saturated salt solution, dried over anhydrous magnesium sulfate and evaporated. The residue was crystallized from ether at 4° C. overnight, to give 1.7 g. (quantitative yield) of cis-2-amino-p-cyclohexanecarboxanisidide of melting point 99–100° C. on recrystallization from ether. Ultraviolet: $\lambda_{max.}$ 251 (16,850); sh. 287 (2,250); sh. 298 (1,200).

*Analysis.*—Calcd. for $C_{14}H_{20}N_2O_2$ (percent): C, 67.71; H, 8.12; N, 11.28. Found (percent): C, 67.72; H, 8.01; N, 11.39.

(D) Cis-2-amino-N-(p - methoxyphenyl)cyclohexanemethylamine and its bis(cyclohexanesulfamate).—A solution of 20 g. (0.080 mole) of cis-2-amino-p-cyclohexanecarboxanisidide in 350 ml. of tetrahydrofuran was added during 10 minutes to a suspension of 20 g. lithium aluminum hydride in 625 ml. of tetrahydrofuran and the mixture was refluxed for 20 hours. It was then cooled in ice, decomposed by successively adding 20 ml. of water, 20 ml. of 15% aqueous sodium hydroxide solution and 60 ml. of water, and stirred for 1 hour at room temperature. The resulting suspension was filtered, the cake obtained washed with tetrahydrofuran, the filtrate was dried over anhydrous magnesium sulfate and evaporated to give 16 g. of crude product as a yellow oil. Some of this oil was purified by dissolving in 10% hydrochloric acid and subsequent basification, extraction with ether and evaporation, to obtain cis-2-amino-N-(p-methoxyphenyl)cyclohexanemethylamine. Ultraviolet: $\lambda_{max.}$ 244 (11,500); 304 (2,000).

A solution of 3.3 g. (0.0141 mole) of the crude product in 10 ml. of methanol was added to a solution of cyclohexanesulfamic acid (5 g.; 0.0242 mole) in 5 ml. of methanol. The solution was diluted with ether to the point of cloudiness, seeded and allowed to stand for 70 hours. The solid was filtered and washed with ether to give 6.4 g. of cis-2-amino-N - (p - methoxyphenyl)cyclohexanemethylamine bis(cyclohexanesulfamate) of melting point 142–144° C. Ultraviolet: $\lambda_{max.}$ 243 (11,850); 307 (2,100).

*Analysis.*—Calcd. for $C_{14}H_{22}N_2O \cdot 2C_6H_{11}NHSO_3H$ (percent): C, 52.68; H, 8.16; N, 9.45; S, 10.82. Found (percent): C, 52.59; H, 8.10; N, 9.44; S, 10.77.

*Example 71.—Cis-2-amino-N-methyl-N-(p-methoxyphenyl)cyclohexanemethylamine*

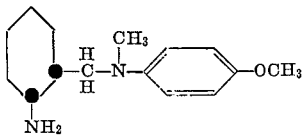

(A) Formation of Schiff's base of cis-2-amino-N-(p-methoxyphenyl)cyclohexanemethylamine.—A solution of 2.34 g. (0.01 mole) of cis-2-amino-N-(p-methoxyphenyl)cyclohexanemethylamine in 50 ml. of acetone was heated for 4 hours at reflux. The solution was then evaporated to give the Schiff's base used in B.

(B) Schiff's base of cis-4'-methoxy-N-[(2-aminocyclohexyl)methyl]formanilide.—In the manner given in Example 13, the above Schiff's base (part A) was heated with 10 ml. formic acid, then cooled with ice and 50 ml. of 20% aqueous sodium hydroxide solution added, keeping the temperature between 10 and 15° C. The mixture was then extracted with ether and the ether solution evaporated to give the Schiff's base of cis-4'-methoxy-N-[(2-aminocyclohexyl)methyl]formanilide.

(C) Decomposition of the Schiff's base of cis-4'-methoxy-N-[(2 - aminocyclohexyl)methyl]formanilide.— A solution of 3.02 g. (0.01 mole) of the Schiff's base of cis - 4' - methoxy-N-[(2-aminocyclohexyl)methyl]formanilide in 20 ml. of 10% aqueous hydrochloric acid was left to stand at room temperature for 2 hours. The mixture was then basified with 10% aqueous sodium hydroxide solution and extracted with methylene chloride. The methylene chloride extract was dried over anhydrous magnesium sulfate and evaporated to give cis-4'-methoxy-N-[(2-aminocyclohexyl)methyl]formanilide.

(D) Cis - 2 - amino-N-methyl-N-(p-methoxyphenyl) cyclohexanemethylamine.—In the manner given in Example 14, the formanilide (Part C) was treated in benzene solution with an ether solution of lithium aluminum hydride to give cis-2-amino-N-methyl-N-(p-methoxyphenyl) cyclohexanemethylamine.

Using in Example 71B instead of formic acid, acetic, propionic, butyric, isobutyric or benzoic anhydride in pyridine, and proceeding otherwise as in Example 71C and 71D, produces the cis-2-amino-N-ethyl(propyl, butyl, isobutyl or benzyl) - N - (p-methoxyphenyl)cyclohexanemethylamine.

The procedure of Examples 70 and 71 is used whenever products of Formula I are desired in which $R_1$ and $R_2$ are hydrogen and $R_3$ is a lower alkyl ($n$, $m$, $R_4$ and $R_5$ defined as above).

*Example 72.—Cis - 2-(benzylamino)-N-(p-methoxyphenyl)cyclohexanemethylamine and its dihydrochloride*

(A) Cis - 2 - (benzylamino)-p-cyclohexanecarboxanisidide.—A mixture of 24.7 g. (0.1 mole) of 2-oxo-p-cyclohexanecarboxanisidide, 10.7 g. (0.1 mole) of benzylamine, and 150 ml. of benzene was refluxed for 2 hours, using an azeotropic separator to separate the water (1.9 ml.) formed during the reaction. The mixture was evaporated to dryness, the residue was dissolved in 200 ml. of ethanol, and the solution was hydrogenated for 3 hours in the presence of 0.1 g. of platinum oxide catalyst at an initial hydrogen pressure of 53.2 p.s.i. The mixture was warmed to dissolve suspended solid material, filtered, and allowed to crystallize. There was thus obtained 29.6 g. (88%) of cis-2-(benzylamino)-p-cyclohexanecarboxanisidide of melting point 117–118.5° C. Analytical sample: M.P. 118–119° C. Ultraviolet: $\lambda_{max.}$ 252 (16,050); sh. 290 (2,150); sh. 300 (1,150).

*Analysis.*—Calcd. for $C_{21}H_{26}N_2O_2$ (percent): C, 74.52; H, 7.74; N, 8.28. Found (percent): C, 74.72; H, 7.71; N, 8.88.

(B) Cis-2-(benzylamino)-N-(p-methoxyphenyl)cyclohexanemethylamine and its dihydrochloride.—A solution of 10.3 g. (0.0305 mole) of cis-2-(benzylamino)-p-cyclohexanecarboxanisidide in 100 ml. of tetrahydrofuran was added during 5 minutes to a suspension of 10.3 g. of lithium aluminum hydride in 1000 ml. of tetrahydrofuran; the mixture was refluxed for 16 hours. It was then cooled in ice and decomposed by successively adding 10.3 ml. of water, 10.3 ml. of 15% aqueous sodium hydroxide solution, and 30.9 ml. of water. The suspension was filtered, the cake was washed with tetrahydrofuran, and the combined filtrate and washings were dried with anhydrous magnesium sulfate and evaporated to dryness to obtain 7.5 g. of cis-2-(benzylamino)-N-(p-methoxyphenyl)cyclohexanemethylamine. This free base was dissolved in ether and anhydrous hydrogen chloride was passed into the solution. The resulting solid was recrystallized from methanol to give 7.0 g. of cis-2-(benzylamino)-N-(p-methoxyphenyl) - cyclohexanemethylamine dihydrochloride of melting point 245–247° C. Ultraviolet: $\lambda_{max}$. 239 (11,750); sh. 266 (894); sh. 302 (2,050).

*Analysis.*—Calcd. for $C_{21}H_{28}N_2O \cdot 2HCl$ (percent): C, 63.50; H, 7.61; Cl, 17.80; N, 7.05. Found (percent): C, 63.49; H, 7.66; Cl, 17.80; N, 6.69.

*Example 73.—Cis-1-{2-[p-hydroxyanilino)methyl]cyclohexyl}piperidine dihydrobromide*

Cis-1-{2-[(p-methoxyanilino)methyl]cyclohexyl}piperidine dihydrochloride (1.5 g.; 0.0040 mole) was dissolved in warm 48% hydrobromic acid (35 ml.) and heated at reflux for 16 hours. The solution was then cooled to about 5° C. and the precipitate which formed was removed by filtration, washed with ether, and recrystallized from absolute ethanol to afford 1.2 g. (67% yield) of cis-1-{2-[(p - hydroxyanilino)methyl]cyclohexyl}-piperidine dihydrobromide of melting point 262–263° C.

*Analysis.*—Calcd. for $C_{18}H_{28}N_2O \cdot 2HBr$ (percent: C, 47.99; H, 6.73; Br, 35.50; N, 6.22. Found (percent: C, 47.73; H, 7.16; Br, 35.18; N, 6.44.

I claim:
1. A member selected from the group consisting of a compound of the formula:

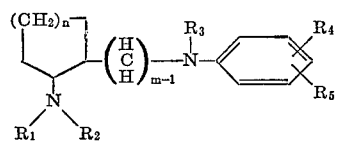

wherein $n$ is 1 to 4, inclusive; wherein $m$ is 1 or 2; wherein $R_1$ and $R_2$ are selected from the group consisting of hydrogen, alkyl having from 1 to 4 carbon atoms, inclusive, and benzyl, or wherein the group

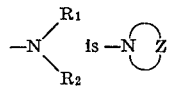

in which

represents a member selected from the group consisting of pyrrolidino, alkylpyrrolidino, morpholino, alkylmorpholino, 4 - alkylpiperazino, piperidino, alkylpiperidino, hexamethyleneimino, alkylhexamethyleneimino, heptamethyleneimino, and octamethyleneimino; wherein $R_3$ is selected from the group consisting of hydrogen, alkyl as defined above, and benzyl; and wherein $R_4$ and $R_5$ are selected from the group consisting of hydrogen, alkyl and alkoxy having from 1 to 4 carbon atoms, inclusive, hydroxy, halogen and —$CF_3$, with the proviso that when $m$ is 1 and

is other than

at least one of $R_4$ and $R_5$ is selected from the group consisting of hydroxy, alkoxy as defined above, halogen and —$CF_3$, and the acid addition salts thereof.

2. As a pharmacologically acceptable acid addition salt, a compound according to claim 1.

3. A trans compound according to claim 1 wherein $n$ is 2, $m$ is 1,

is piperidino, $R_3$ and $R_5$ are hydrogen and $R_4$ is p-methoxy, so that the compound is trans-1-[2-(p-methoxyanilino)-cyclohexyl]piperidine.

4. A trans compound according to claim 1 wherein $n$ is 2, $m$ is 1,

is piperidino, $R_3$ is methyl, $R_4$ is p-methoxy, and $R_5$ is hydrogen, so that the compound is trans-1-[2-(p-methoxy-N-methylanilino)cyclohexyl]piperidine.

5. A cis compound according to claim 1 wherein $n$ is 2, $m$ is 1, $R_1$, $R_2$, $R_3$, and $R_5$ are hydrogen, and $R_4$ is p-methoxy, so that the compound is cis-2-(p-methoxyanilino)cyclohexylamine.

6. A cis compound according to claim 1 wherein $n$ is 2, $m$ is 1,

is piperidino, $R_3$ and $R_5$ are hydrogen and $R_4$ is p-methoxy, so that the compound is cis-1-[2-(p-methoxyanilino)cyclohexyl]piperidine.

7. A cis compound according to claim 1 as dihydrochloride wherein $n$ is 2, $m$ is 2,

is piperidino, $R_3$ and $R_4$ are hydrogen and $R_5$ is p-methoxy, so that the compound is cis-1 - {2-[(p - methoxyanilino)methyl]cyclohexyl}piperidine dihydrochloride.

8. A cis compound according to claim 1 wherein $n$ is 2, $m$ is 2,

is piperidino, $R_3$ and $R_5$ are hydrogen and $R_4$ is p-methoxy, so that the compound is cis-1-{2-[(p-methoxyanilino)methyl]cyclohexyl}piperidine.

9. A cis compound according to claim 1 wherein $n$ is 2, $m$ is 2,

is piperidino, $R_3$ is methyl, $R_4$ is p-methoxy and $R_5$ is hydrogen, so that the compound is cis-1-{2-[(p-methoxy-N-methylanilino)methyl]cyclohexyl}piperidine.

10. A trans compound according to claim 1 as dihydrochloride wherein $n$ is 2, $m$ is 2,

is piperidino, $R_3$ and $R_5$ are hydrogen and $R_4$ is p-methoxy, so that the compound is trans-1-{2[(p-methoxyanilino)methyl]cyclohexyl}piperidine dihydrochloride.

11. A trans compound according to claim 1 wherein $n$ is 2, $m$ is 2,

is piperidino, $R_3$ is methyl, $R_4$ is p-methoxy, and $R_5$ is hydrogen, so that the compound is trans-1-{2-[(p-methoxy-N-methylanilino)methyl]cyclohexyl}piperidine.

12. A cis compound according to claim 1 as dihydrochloride, wherein $n$ is 2, $m$ is 2, $R_1$, $R_3$, and $R_5$ are hydrogen, $R_2$ is benzyl and $R_4$ is p-methoxy, so that the compound is cis-2-(benzylamino)-N-(p-methoxyphenyl)-cyclohexanemethylamine dihydrochloride.

13. A cis compound according to claim 1 as bis(cyclohexanesulfamate) wherein $n$ is 2, $m$ is 2, $R_1$, $R_2$, $R_3$, and $R_4$ are hydrogen and $R_5$ is p-methoxy, so that the compound is cis-2-amino-N-(p-methoxyphenyl)cyclohexanemethylamine bis(cyclohexanesulfamate).

14. A cis compound according to claim 1 as dihydrochloride wherein $n$ is 2, $m$ is 2,

is piperidino, $R_3$, $R_4$, and $R_5$ are hydrogen, so that the compound is cis-1-[2-(anilinomethyl)cyclohexyl]piperidine dihydrochloride.

15. A trans compound according to claim 1 as dihydrochloride wherein $n$ is 2, $m$ is 2,

is piperidino, $R_3$, $R_4$, and $R_5$ are hydrogen, so that the compound is trans-1-[2 - (anilinomethyl)cyclohexyl]piperidine dihydrochloride.

16. A cis compound according to claim 1 as dihydrobromide, wherein $n$ is 2, $m$ is 2,

is piperidino, $R_3$ and $R_5$ are hydrogen and $R_4$ is p-hydroxy, so that the compound is cis-1-{2-[(p-hydroxyanilino)methyl]cyclohexyl}piperidine dihydrobromide.

References Cited

UNITED STATES PATENTS 2,828,313   3/1958   Scholz et al.

HENRY R. JILES, Primary Examiner

S. D. WINTERS, Assistant Examiner

U.S. Cl. X.R.

260—570.5, 570.9, 294.7, 326.5, 326.81, 326.85, 247.5, 268, 239, 247.1, 247, 326,8, 563, 562, 294, 326.3, 247.8, 586, 577, 576, 468, 471, 518, 309.7, 557, 567.6, 348, 247.7; 424—330, 267, 9, 274, 248, 250, 244

UNITED STATES PATENT OFFICE
CERTIFICATE OF CORRECTION

Patent No. 3,510,492     Dated    May 5, 1970

Inventor(s)  Jacob Szmuszkovicz

It is certified that error appears in the above-identified patent and that said Letters Patent are hereby corrected as shown below:

Column 4, Formula Ie: should appear as shown below instead of as in the patent:

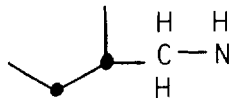

Column 4, Formula XIX, should appear as shown below instead of as in the patent:

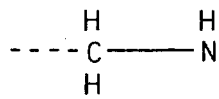

Column 5, formula, for "XXXIII" read -- XXIII --; line 53, for "(XXIa)" read -- (XXIa) --; line 62 for "XXXIa" read -- XXIa --. Column 14, line 60, for "pentyl)-2-butylpiperidine and p-isobutylaniline were" read -- pentyl)-4-methylpiperidine and p-butoxyaniline were --. Column 15, line 6, for "pentyl)-4-methylpiperidine and p-butoxyaniline were" read -- pentyl)-2-butylpiperidine and p-isobutylaniline were --. Column 21, line 22, for "benzimidozalinone" read -- benzimidazolinone --. Column 22, line 35, for "-2-p-" read -- -2-(p- --. Column 25, line 4, for "H, 9:15" read -- H, 9.15 --. Column 26, line 28, for "withi" read -- with --. Column 27, line 64, for "2-[m-" read -- 2-[(m- --; line 68, for "2-[2,4-" read -- 2-[(2,4- --; line 70, for "2-[m-" read -- 2-[(m- --; line 72, for "2-[2,4" read -- 2-[(2,4 --; line 74, for "2-[p-" read -- 2-[(p- --. Column 28, lines 5-6, for "cyclopentyl}-4-butlpiperazine" read -- cyclopentyl}-4-butyl-piperazine --; line 59, for "236 ((13,300); (2,240)." read -- 236 (13,300); 297 (2,240). --; line 62, for Page 2

UNITED STATES PATENT OFFICE
CERTIFICATE OF CORRECTION

Patent No. 3,510,492　　　　　　　Dated　May 5, 1970

Inventor(s)　Jacob Szmuszkovicz

It is certified that error appears in the above-identified patent and that said Letters Patent are hereby corrected as shown below:

"H, 8.82" read -- H, 8.72 --. Column 29, line 37, for "1-{-[(p-" read -- 1-{2-[(p- --; line 49, for "aqueuos" read -- aqueous --; line 63, for "1-{-[(p-" read -- 1-{2-[(p- --. Column 31, line 36, for "4'-ffuoro-2-(4-isoprpyl" read -- 4'-fluoro-2-(4-isopropyl --; line 38, for "ffuoro" read -- fluoro --. Column 34, line 40, for "N-isobutylanilino" read -- N-propylanilino --. Column 36, line 1, for "formula::" read -- formula: --; line 47, for "benzensulfonates" read -- benzenesulfonates --. Column 40, line 30, for "$R_3$ and $R_4$ are hydrogen and $R_5$" read -- $R_3$ and $R_5$ are hydrogen and $R_5$ --.

Signed and sealed this 30th day of November 1971.

(SEAL)
Attest:

EDWARD M. FLETCHER, JR.　　　　ROBERT GOTTSCHALK
Attesting Officer　　　　　　　Acting Commissioner of Patents